(12) United States Patent
Komori

(10) Patent No.: US 12,063,002 B1
(45) Date of Patent: Aug. 13, 2024

(54) MOTOR BEARING WEAR STATE ESTIMATION DEVICE, BEARING WEAR STATE ESTIMATION METHOD, BEARING WEAR STATE ESTIMATION PROGRAM, AND CANNED MOTOR PUMP

(71) Applicant: NIKKISO CO., LTD., Tokyo (JP)

(72) Inventor: Chihiro Komori, Tokyo (JP)

(73) Assignee: NIKKISO CO., LTD., Tokyo (JP)

( * ) Notice: Subject to any disclaimer, the term of this patent is extended or adjusted under 35 U.S.C. 154(b) by 0 days.

(21) Appl. No.: 18/691,122

(22) PCT Filed: Dec. 21, 2023

(86) PCT No.: PCT/JP2023/045938
§ 371 (c)(1),
(2) Date: Mar. 12, 2024

(30) Foreign Application Priority Data

Mar. 16, 2023 (JP) ................. 2023-042051

(51) Int. Cl.
*G05B 5/00* (2006.01)
*F04D 13/06* (2006.01)
(Continued)

(52) U.S. Cl.
CPC .......... *H02P 23/14* (2013.01); *F04D 13/0606* (2013.01); *G01D 5/20* (2013.01);
(Continued)

(58) Field of Classification Search
CPC .... H02P 23/14; H02P 23/0022; H02P 29/024; H02P 31/00; H02K 11/225; H02K 7/083; G01D 5/20; G01M 13/04
See application file for complete search history.

(56) References Cited

U.S. PATENT DOCUMENTS 5,926,001 A 7/1999 Eguchi
2021/0003953 A1 1/2021 Miyauchi et al.

FOREIGN PATENT DOCUMENTS

CN 105804981 A 7/2016
CN 205607643 U 9/2016
(Continued)

OTHER PUBLICATIONS

JP2023-042051, Notice for Reasons for Refusal, Apr. 10, 2023.
(Continued)

*Primary Examiner* — Karen Masih
(74) *Attorney, Agent, or Firm* — WC&F IP

(57) ABSTRACT

The motor bearing wear state estimation device (5, 5A) estimates a wear state of bearings (32, 33) by using a plurality of detection coils (C1 to C8). The device includes a storage (56, 56A) storing a first learning model (M11, M21) and a second learning model (M12, M22), a retrieval unit (550) retrieving each signal, and an estimation unit (551) estimating the wear state by inputting a first difference signal, a second difference signal, and an amplitude signal into the first learning model, and by inputting a thrust difference signal and the amplitude signal into the second learning model. The amplitude signal is a first amplitude signal generated based on each detection signal of first radial detection coils and/or each detection signal of second radial detection coils, or a second amplitude signal generated based on a first combined signal and a second combined signal.

8 Claims, 16 Drawing Sheets

(51) Int. Cl.
  *G01D 5/20* (2006.01)
  *G01M 13/04* (2019.01)
  *H02K 7/08* (2006.01)
  *H02K 11/225* (2016.01)
  *H02P 23/00* (2016.01)
  *H02P 23/14* (2006.01)

(52) U.S. Cl.
  CPC ............ *G01M 13/04* (2013.01); *H02K 7/083* (2013.01); *H02K 11/225* (2016.01); *H02P 23/0022* (2013.01)

(56) References Cited

FOREIGN PATENT DOCUMENTS

| | | |
|---|---|---|
| CN | 111886550 B | 8/2022 |
| JP | H10-080103 A | 3/1998 |
| JP | 2007-162700 A | 6/2007 |
| JP | 7138817 B1 | 9/2022 |
| JP | 7250196 B1 * | 3/2023 |
| TW | 453012 B | 9/2001 |
| WO | 1998/025123 A2 | 6/1998 |

OTHER PUBLICATIONS

PCT/JP2023/045938, International Search Report, Jan. 24, 2024.
Intellectual Property Bureau, Ministry of Economic Affairs (Republic of China (Taiwan)), Notice of Examination Opinion, 2024.

* cited by examiner rear direction ← → front direction

MOTOR BEARING WEAR STATE ESTIMATION DEVICE, BEARING WEAR STATE ESTIMATION METHOD, BEARING WEAR STATE ESTIMATION PROGRAM, AND CANNED MOTOR PUMP

TECHNICAL FIELD

The present invention relates to a motor bearing wear state estimation device, a bearing wear state estimation method, a bearing wear state estimation program, and a canned motor pump.

BACKGROUND ART

A canned motor pump has a structure in which a pump and a motor are integrated and handling liquid does not leak. In general, a rotating structure portion of the canned motor pump (a rotor, a rotating shaft, a bearing, and an impeller) is sealed in a can filled with the handling liquid. Thus, the internal structure of the canned motor pump cannot be visually monitored from the outside. Accordingly, in order to efficiently operate the canned motor pump having such a structure, a device for monitoring a wear state of the bearing (hereinafter referred to as "monitoring device") is used (for example, see PTL 1).

The monitoring device (the motor bearing wear monitoring device) disclosed in PTL 1 monitors displacement of the rotor (the rotating shaft) in the radial direction and the thrust direction caused by bearing wear by using detection coils attached to both ends of the stator in the longitudinal direction and measuring a change in magnetic flux when the rotor rotates. This method includes zero adjustment to adjust an output of the detection coils so that, when the bearing is not worn, the output of the detection coils indicates that the displacement is zero. The monitoring device detects a voltage induced in the detection coils by the rotation of the motor. Thus, the zero adjustment is performed in a state where the motor is rotated by a predetermined driving condition to be used.

The canned motor pump uses a method of reducing a flow rate by throttling back a valve on piping connected to a discharge side of the canned motor pump. The method increases the resistance of liquid flowing through the piping, resulting in energy loss. In recent years, a method has been used in which a driving condition (for example, a driving frequency, a driving voltage, etc.) of a motor is changed by an inverter (for example, see PTL 2). In this method, since no energy loss occurs unlike the method of throttling the valve, the adjustment of the flow rate by using this method has become mainstream in recent years.

CITATION LIST

Patent Literature

[PTL 1] JP H10-080103 A
[PTL 2] JP2007-162700 A

SUMMARY OF INVENTION

Technical Problem

However, as described above, the monitoring device measures the change in the magnetic flux when the rotor rotates. Thus, when the driving condition is changed by the inverter, the voltage induced in the detection coil varies, and technical issues occur such as erroneous detection due to a deviation in a corresponding relation between a measured value and an amount of wear. As a result, manual adjustment of the corresponding relation (zero adjustment) is required every time the driving condition is changed. In this way, the conventional monitoring device requires manual operation in order to detect (estimate) the wear amount (the wear state) depending on the driving condition with respect to the change in the driving condition by the inverter.

The present invention is directed to providing a motor bearing wear state estimation device, a bearing wear state estimation method, a bearing wear state estimation program, and a canned motor pump that are capable of estimating a wear state without manual operation for the device even when a driving condition is changed.

Solution to Problem

A motor bearing wear state estimation device according to one aspect of the present invention is a motor bearing wear state estimation device for estimating a wear state of bearings that support a rotating shaft of a rotor, based on each detection signal of a plurality of detection coils that each detects a change in magnetic flux corresponding to a mechanical position change of the rotor with respect to a stator of a motor in a canned motor pump, in which each of the plurality of detection coils is attached to the stator, the detection signal includes a fundamental component based on a driving frequency of the motor, the plurality of detection coils includes a plurality of radial detection coils that each detects the change in the magnetic flux in a radial direction of the rotating shaft and a plurality of thrust detection coils that each detects the change in the magnetic flux in a thrust direction of the rotating shaft, in which the plurality of radial detection coils includes a pair of first radial detection coils and another pair of second radial detection coils, and the plurality of thrust detection coils include a pair of first thrust detection coils and another pair of second thrust detection coils, and the motor bearing wear state estimation device includes: a storage that stores a learned first learning model that is machine-learned in such a way as to output the wear state in the radial direction when a first difference signal indicating a difference between each detection signal of the pair of first radial detection coils, a second difference signal indicating a difference between each detection signal of the pair of second radial detection coils, and an amplitude signal indicating an amplitude of the fundamental component are input, and a learned second learning model that is machine-learned in such a way as to output the wear state in the thrust direction when a thrust difference signal indicating a difference between a first combined signal obtained by combining each detection signal of the pair of first thrust detection coils and a second combined signal obtained by combining each detection signal of the pair of second thrust detection coils, and the amplitude signal are input; a retrieval unit that retrieves the first difference signal, the second difference signal, the thrust difference signal, and the amplitude signal; and an estimation unit that estimates the wear state by inputting the first difference signal, the second difference signal, and the amplitude signal that are retrieved by the retrieval unit into the first learning model, and by inputting the thrust difference signal and the amplitude signal that are retrieved by the retrieval unit into the second learning model, in which the amplitude signal is a first amplitude signal generated based on each detection signal of the first radial detection coils and/or each detection signal of the second radial detection coils, or a second amplitude signal generated based on the first combined signal and the second combined signal.

A motor bearing wear state estimation method according to one aspect of the present invention is a motor bearing wear state estimation method executed by a motor bearing wear state estimation device for estimating a wear state of bearings that support a rotating shaft of a rotor, based on each detection signal of a plurality of detection coils that each detects a change in magnetic flux corresponding to a mechanical position change of the rotor with respect to a stator of a motor in a canned motor pump, in which each of the plurality of detection coils is attached to the stator, the detection signal includes a fundamental component based on a driving frequency of the motor, the plurality of detection coils includes a plurality of radial detection coils that each detects the change in the magnetic flux in a radial direction of the rotating shaft and a plurality of thrust detection coils that each detects the change in the magnetic flux in a thrust direction of the rotating shaft, in which the plurality of radial detection coils include a pair of first radial detection coils and another pair of second radial detection coils, and the plurality of thrust detection coils include a pair of first thrust detection coils and another pair of second thrust detection coils, and the motor bearing wear state estimation device includes a storage that stores a learned first learning model that is machine-learned in such a way as to output the wear state in the radial direction when a first difference signal indicating a difference between each detection signal of the pair of first radial detection coils, a second difference signal indicating a difference between each detection signal of the pair of second radial detection coils, and an amplitude signal indicating an amplitude of the fundamental component are input, and a learned second learning model that is machine-learned in such a way as to output the wear state in the thrust direction when a thrust difference signal indicating a difference between a first combined signal obtained by combining each detection signal of the pair of first thrust detection coils and a second combined signal obtained by combining each detection signal of the pair of second thrust detection coils, and the amplitude signal are input, in which the amplitude signal is a first amplitude signal generated based on each detection signal of the first radial detection coils and/or each detection signal of the second radial detection coils, or a second amplitude signal generated based on the first combined signal and the second combined signal, and the motor bearing wear state estimation method includes: a step of retrieving, with the motor bearing wear state estimation device, the first difference signal, the second difference signal, the thrust difference signal, and the amplitude signal; and a step of estimating, with the motor bearing wear state estimation device, the wear state by inputting the retrieved first difference signal, the retrieved second difference signal, and the retrieved amplitude signal into the first learning model and by inputting the retrieved thrust difference signal and the retrieved amplitude signal into the second learning model. A bearing wear state estimation program according to one aspect of the present invention causes a computer to function as the motor bearing wear state estimation device according to the above aspect.

A canned motor pump according to one aspect of the present invention includes: a motor including a rotor, a stator that rotates the rotor, and a rotating shaft that rotates together with the rotor; bearings that support the rotating shaft; a plurality of detection coils that each detects a change in magnetic flux corresponding to a mechanical position change of the rotor with respect to the stator; and the motor bearing wear state estimation device according to the above aspect for estimating a wear state of the bearings, based on each detection signal output from the plurality of detection coils.

Advantageous Effects of Invention

The present invention is able to provide the motor bearing wear state estimation device, the bearing wear state estimation method, the bearing wear state estimation program, and the canned motor pump, which are capable of estimating the wear state without manual operation for the device even when a driving condition is changed.

BRIEF DESCRIPTION OF DRAWINGS

FIG. 16 is a schematic diagram illustrating a change in a criterion for determining a thrust wear state before and after a change in a driving frequency.

FIG. 19 is a schematic diagram illustrating weighting by a signal generation unit included in the motor bearing wear state estimation device in FIG. 17.

DESCRIPTION OF EMBODIMENTS

Figure 1:
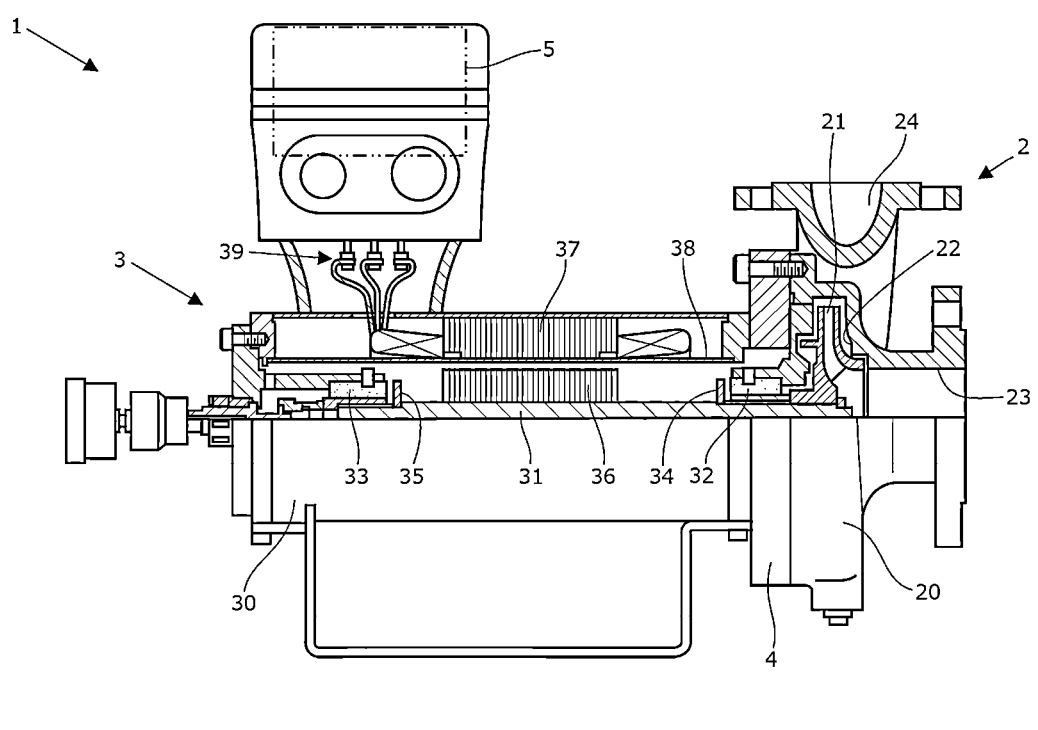
FIG. 1 is a side view of a canned motor pump illustrating an embodiment of the canned motor pump according to the present invention.

The present invention enables a motor bearing wear state estimation device for a canned motor pump to include a function of automatically retrieving a detection signal and a signal indicating an amplitude (a signal level, a potential) of the detection signal, and a function of automatically estimating a wear state of bearings depending on a driving condition by using the retrieved signals and a learned learning model. As a result, the present invention is able to estimate the wear state depending on the driving condition without manual operation for the device even when the driving condition is changed, and thereby enabling an inverter to control flow rate in the canned motor pump. Detail of each term will be described later.

Embodiments of a canned motor pump according to the present invention (hereinafter referred to as "present pump"), a motor bearing wear state estimation device according to the present invention (hereinafter referred to as "present device"), a bearing wear state estimation method according to the present invention (hereinafter referred to as "present method"), and a bearing wear state estimation program according to the present invention (hereinafter referred to as "present estimation program") will be described below. In the following description, the drawings will be referred to as necessary. In the drawings, the same members and components are indicated with the same reference signs, and repetitive description thereof will be omitted. The dimensional ratios of the components may be exaggerated for convenience of description and are not limited to the ratios illustrated in the drawings.

Canned Motor Pump

Configuration of Canned Motor Pump

First, the configuration of the present pump will be described.

FIG. 1 is a side view of the present pump illustrating an embodiment of the present pump. In the figure, an upper half portion of the present pump 1 is illustrated in section for convenience of description.

The present pump 1 is a pump having a structure in which handling liquid does not leak and used in particular for feeding high-temperature liquid or highly dangerous liquid (e.g., a liquid that is explosive, flammable, or toxic). The present pump 1 includes a pump unit 2, a motor unit 3, an adapter 4, and the present device 5.

In the configurations of the present pump 1, the configurations of the pump unit 2, the motor unit 3, and the adapter 4 are common to the configurations of a known canned motor pump. Thus, in the following description, the configurations of the pump unit 2, the motor unit 3, and the adapter 4 will be briefly described, and the detailed description thereof will be omitted.

In the following description, the "front direction" is a direction (forward) in which the pump unit 2 is positioned with respect to the motor unit 3, and the "rear direction" is a direction (backward) in which the motor unit 3 is positioned with respect to the pump unit 2.

The pump unit 2 sucks and discharges the handling liquid. The pump unit 2 includes a housing 20, an impeller 21, a pump chamber 22, a suction pipe portion 23, and a discharge pipe portion 24. The housing 20 includes the pump chamber 22 that accommodates the impeller 21, the suction pipe portion 23 that is a path for the handling liquid to be sucked into the pump chamber 22, and the discharge pipe portion 24 that is a path for the handling liquid to be discharged from the pump chamber 22. The pump chamber 22 communicates with the suction pipe portion 23 and the discharge pipe portion 24.

The motor unit 3 is driven under a predetermined driving condition (e.g., the driving voltage: 200 V, the driving frequency: 60 Hz) and rotates the impeller 21 of the pump unit 2. The motor unit 3 includes a housing 30, a rotating shaft 31, two bearings 32 and 33, two thrust washers 34 and 35, a rotor 36, a stator 37, a can 38, and a terminal 39. The motor unit 3 is an example of the motor in the present invention.

Figure 2:
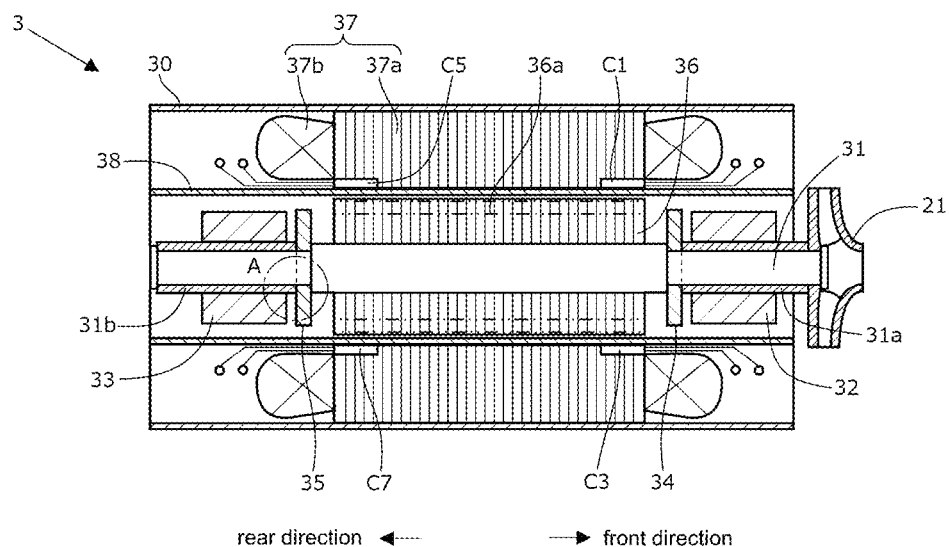
FIG. 2 is a schematic sectional view of a motor unit illustrating a longitudinal section of the motor unit included in the canned motor pump in FIG. 1.
Figure 3:
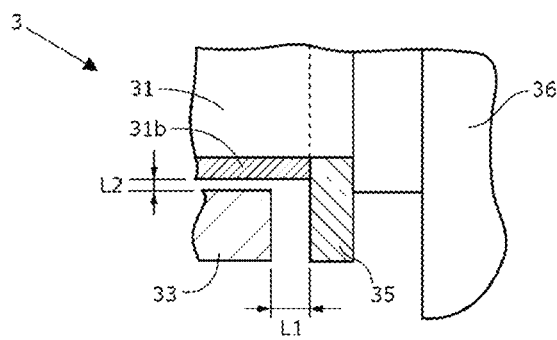
FIG. 3 schematically illustrates an enlarged longitudinal sectional view of a part A of the motor unit in FIG. 2.

FIG. 2 is a schematic sectional view of the motor unit 3 illustrating a longitudinal section of the motor unit 3. FIG. 3 schematically illustrates an enlarged longitudinal sectional view of a part A of the motor unit 3 in FIG. 2.

The housing 30 liquid-tightly accommodates the stator 37 and the can 38.

The rotating shaft 31 rotates by the rotation of the rotor 36 and transmits rotating power to the impeller 21. The rotating shaft 31 has a solid cylindrical shape. The rotating shaft 31 is disposed through the rotor 36 and is fixed. A front end portion of the rotating shaft 31 projects into the pump chamber 22 (see FIG. 1), and the impeller 21 is attached to the front end portion. The rotating shaft 31 includes hollow cylindrical-shaped sleeves 31a and 31b that protect a front portion and a rear portion of the rotating shaft 31.

In the following description, the "thrust direction" is an axial direction of the rotating shaft 31, the "radial direction" is a radial direction of the rotating shaft 31, and the "circumferential direction" is a circumferential direction of the rotating shaft 31.

The bearing 32 is disposed at the front direction of the rotor 36 and rotatably supports the rotating shaft 31. The bearing 33 is disposed at the rear direction of the rotor 36 and rotatably supports the rotating shaft 31. The bearings 32 and 33 are rolling bearings, for example. The thrust washer 34 is attached between the bearing 32 and the rotor 36 on the rotating shaft 31 and restricts the movement of the rotating shaft 31 in the front direction. The thrust washer 35 is attached between the bearing 33 and the rotor 36 on the rotating shaft 31 and restricts the movement of the rotating shaft 31 in the rear direction.

A gap of the length L1 is each defined between the bearing 32 and the thrust washer 34 and between the bearing 33 and the thrust washer 35. A gap of the length L2 is each defined between the bearing 32 and the sleeve 31a and between the bearing 33 and the sleeve 31b.

The rotor 36 rotates due to a rotating magnetic field generated in the stator 37. The rotor 36 has a hollow cylindrical shape. The rotor 36 includes a plurality of rod-shaped rotor bars 36a, the number being 28 in the present embodiment, that are embedded at equal intervals in an outer peripheral edge portion of the rotor 36 in the circumferential direction. When the bearings 32 and 33 are not worn, the rotor 36 is disposed at an initial position with respect to the stator 37. In the present embodiment, the "initial position" is a position where the center of the stator 37 and the center of the rotor 36 coincide with each other in the thrust direction and the radial direction.

The stator 37 generates the rotating magnetic field that rotates the rotor 36. The stator 37 has a substantially hollow cylindrical shape. The stator 37 includes a stator core 37a and a plurality of motor windings 37b.

The stator core 37a holds the motor winding 37b. The stator core 37a has a hollow cylindrical shape. The stator core 37a includes a plurality of tooth portions 37c (see FIG. 6, the same applies hereinafter).

The tooth portions 37c define a slot 37d (see FIG. 6, the same applies hereinafter) through which the motor winding 37b is disposed. In the circumferential direction, the tooth portions 37c are disposed at equal intervals on an inner peripheral surface of the stator core 37a. The motor winding 37b is disposed through the slot 37d and is connected to a power supply device (not illustrated) such as an inverter, for example, via the terminal 39.

The can 38 liquid-tightly accommodates the rotating shaft 31, the bearings 32 and 33, the thrust washers 34 and 35, and the rotor 36. The can 38 has a hollow cylindrical shape. Some handling liquid introduced from the suction pipe portion 23 is introduced into the can 38, used for cooling the bearings 32 and 33 and the motor unit 3, and discharged to the discharge pipe portion 24.

The figure mainly referred to in the present description return to FIG. 1. The adapter 4 is connected to an end portion of the pump unit 2 on the rear side and an end portion of the motor unit 3 on the front side, and the adapter 4 interconnects the pump unit 2 and the motor unit 3.

The present device 5 detects a change in magnetic flux corresponding to a mechanical position change of the rotor 36 with respect to the stator 37, and thereby estimating a wear state of the bearings 32 and 33 supporting the rotating shaft 31. A specific configuration of the present device 5 will be described later.

Motor Bearing Wear State Estimation Device 1
Configuration of Motor Bearing Wear State Estimation Device 1

Next, the configuration of the present device 5 will be described. In the following description, FIGS. 1 to 3 will be referred to as necessary.

Figure 4:
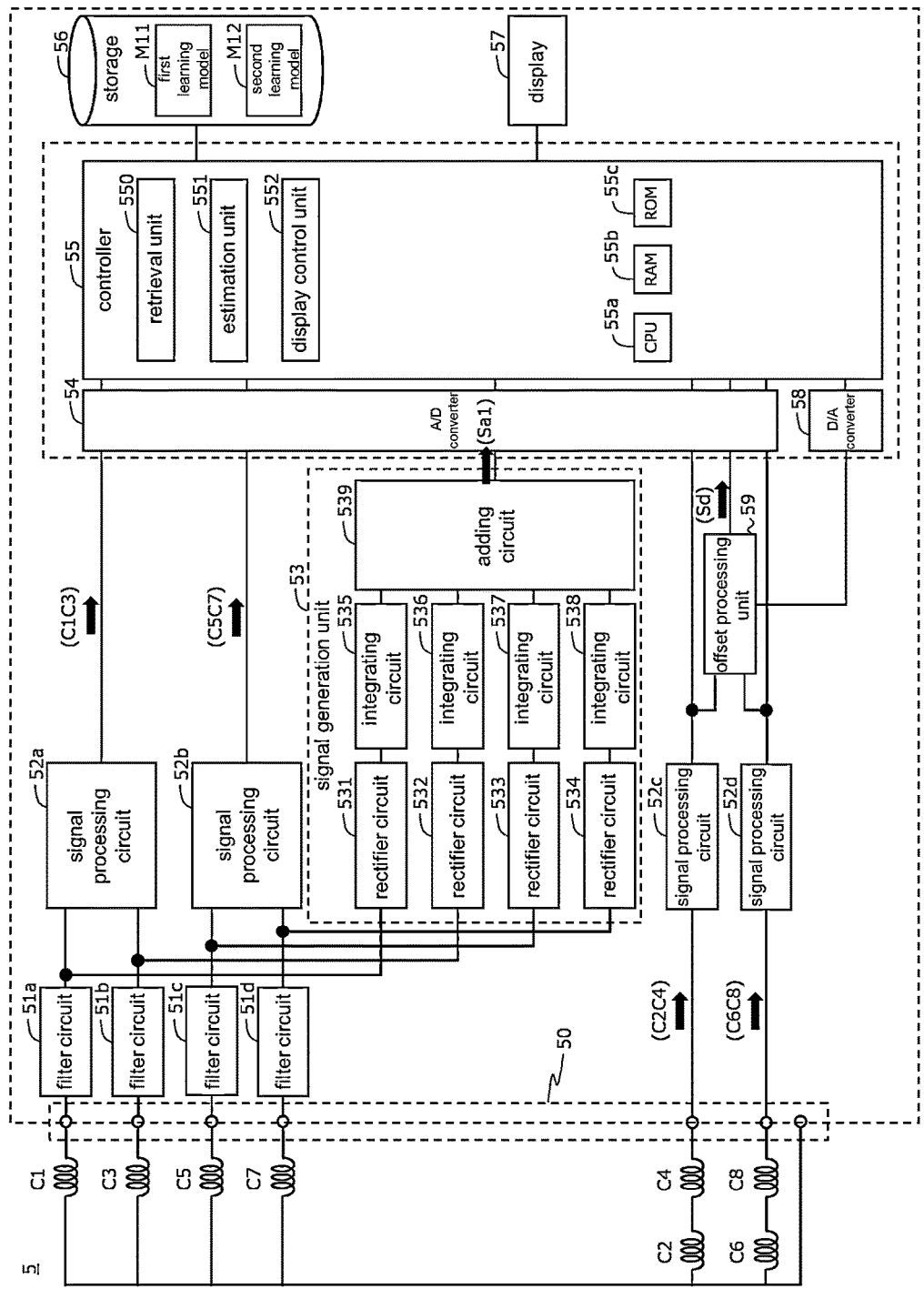
FIG. 4 is a functional block diagram illustrating an embodiment of a motor bearing wear state estimation device according to the present invention.

FIG. 4 is a functional block diagram illustrating an embodiment of the present device 5.

The present device 5 includes eight detection coils C1, C2, C3, C4, C5, C6, C7, and C8, a connection 50, filter circuits 51a, 51b, 51c, and 51d, signal processing circuits 52a, 52b, 52c, and 52d, a signal generation unit 53, an A/D converter 54, a controller 55, a storage 56, a display 57, a D/A converter 58, and an offset processing unit 59. The A/D converter 54, the controller 55, and the D/A converter 58 are implemented by a microcomputer, for example.

Note that, in the present invention, the motor unit 3 may include the detection coils C1 to C8.

Figure 5:
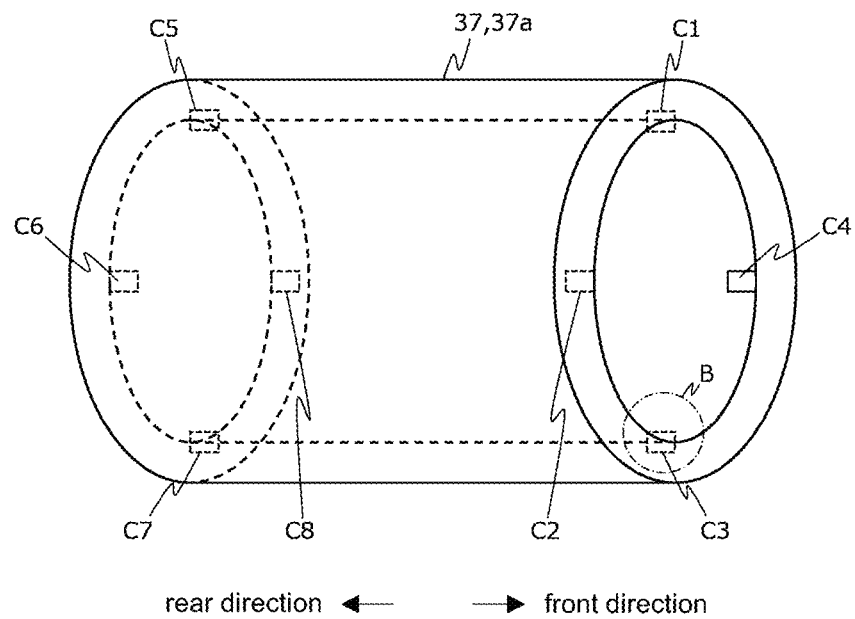
FIG. 5 is a schematic perspective view of a stator core illustrating arrangement of detection coils included in the motor bearing wear state estimation device in FIG. 4.
Figure 6:
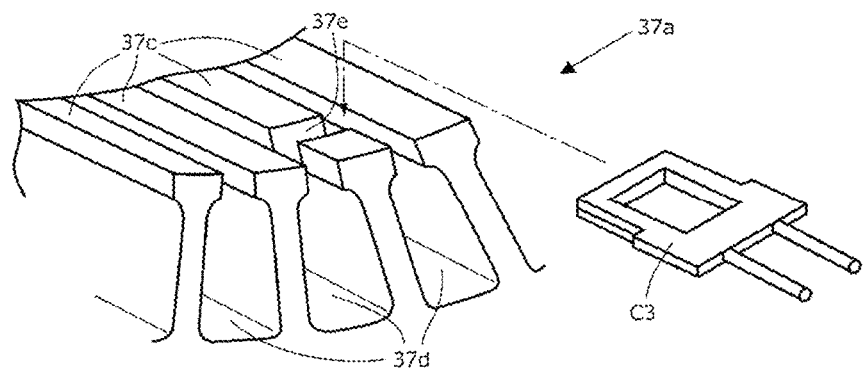
FIG. 6 is an enlarged perspective view of a part B in FIG. 5.

FIG. 5 is a schematic perspective view of the stator core 37a illustrating the arrangement of the detection coils C1 to C8. FIG. 6 is an enlarged perspective view of a part B in FIG. 5.

Each of the detection coils C1 to C8 detects a change in magnetic flux corresponding to a position change (displacement) of the rotor 36 with respect to the stator 37, generates a detection signal indicating the change in the magnetic flux, and outputs the detection signal. The rotor 36 is displaced in the radial direction together with the rotating shaft 31 depending on an amount of wear (a wear state) of the bearings 32 and 33 in the radial direction, and the rotor 36 is displaced together with the rotating shaft 31 in the thrust direction depending on an amount of wear (a wear state) of the bearings 32 and 33 in the thrust direction. That is, the amount of displacement of the rotor 36 can be regarded as the amount of wear (the wear state) of the bearings 32 and 33. Thus, the present device 5 is able to estimate the wear state (the amount of wear) of the bearings 32 and 33 by retrieving the detection signals indicating the amount of displacement of the rotor 36 by using the detection coils C1 to C8. Each of the detection coils C1 to C8 has a flat bobbin shape. The detection coils C1 to C8 are fitted into notches 37e formed in tooth portions 37c at end portions on the front side and the rear side of the stator 37.

In the circumferential direction, the detection coils C1 to C4 are attached at equal intervals (at intervals of 90 degrees) to an end portion on the front side of the tooth portions 37c of the stator 37. The detection coil C1 is disposed at a position of 180 degrees with respect to the detection coil C3 so as to face the detection coil C3, and the detection coil C2 is disposed at a position of 180 degrees with respect to the detection coil C4 so as to face the detection coil C4. In contrast, in the circumferential direction, the detection coils C5 to C8 are attached at equal intervals (at intervals of 90 degrees) to an end portion on the rear side of the tooth portions 37c of the stator 37. The detection coil C5 is disposed at a position of 180 degrees with respect to the detection coil C7 so as to face the detection coil C7, and the detection coil C6 is disposed at a position of 180 degrees with respect to the detection coil C8 so as to face the detection coil C8.

Figure 7:
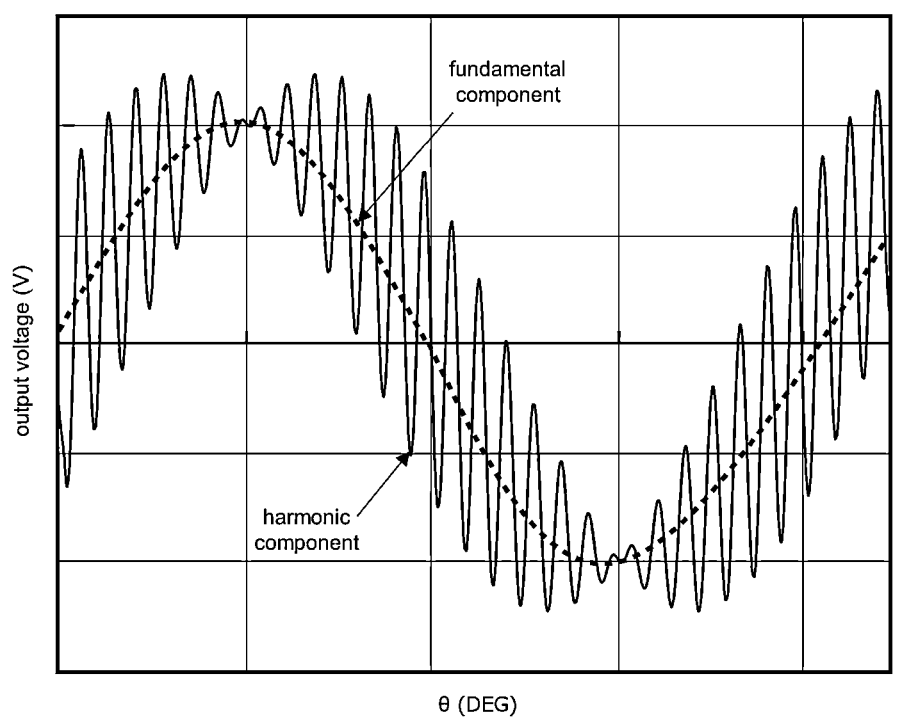
FIG. 7 is a schematic diagram illustrating an example of a detection signal of the detection coil in FIG. 5.

FIG. 7 is a schematic diagram illustrating an example of the detection signal.

In the figure, the horizontal axis indicates a rotation angle of the rotor 36, and the vertical axis indicates an output voltage (a signal level) of induced electromotive force of the detection coils C1 to C8. The detection signals of the detection coils C to C8 include a waveform corresponding to a change in main magnetic flux of the motor unit 3 (hereinafter referred to as "fundamental component") and a waveform corresponding to a change in magnetic flux generated by an induced current flowing through the rotor bars 36a of the rotor 36 (hereinafter referred to as "harmonic component"). The fundamental component is generated by a driving voltage of the motor unit 3, and the frequency thereof is the same as a driving frequency of the driving voltage. The harmonic component is generated by the induced current flowing through the rotor bars 36a, and the frequency thereof is determined by the rotation of the rotor 36 and the number of the rotor bars 36a. That is, for example, under the following conditions: the driving frequency is 60 Hz, and the number of rotor bars 36a is 28, each of the detection coils C1 to C8 detects 28 times a change in the magnetic flux due to the rotor bar 36a while the rotor 36 rotates once. Thus, the frequency of the harmonic component is 60 Hz×28=1.68 kHz. In this way, the fundamental component is determined based on the driving frequency, and the harmonic component is determined based on the rotation of the rotor 36, the driving frequency, and the number of the rotor bars 36a.

Herein, the rotation speed of the motor unit 3 can be easily changed by varying the driving frequency using inverter control. In this case, lowering only the driving frequency without lowering the driving voltage causes the motor unit 3 to burn out, and thus the driving frequency and the driving voltage are generally changed at the same time. The increase and decrease in the driving frequency and the increase and decrease in the driving voltage are proportional to each other. That is, the driving voltage decreases in proportion to the decrease in the driving frequency and increases in proportion to the increase in the driving frequency. As described above, the fundamental component of the detection signal is generated by the driving voltage, and thus the signal level (the amplitude) of the fundamental component is proportional to the driving frequency and the driving voltage. Accordingly, the signal level (the amplitude) of the fundamental component increases and decreases in proportion to an increase and decrease in the driving conditions (driving frequency, driving voltage).

The figure mainly referred to in the present description return to FIGS. 4 and 5. The detection coils C1, C3, C5, and C7 are able to detect the amount of displacement of the rotor 36 in the radial direction (i.e., the amount of wear of the bearings 32 and 33 in the radial direction) by detecting the change in the magnetic flux corresponding to the displacement of the rotor 36 in the radial direction due to an increase in the gap (L2) between the bearing 32 and the sleeve 31a and between the bearing 33 and the sleeve 31b. The detection coils C1 and C3 constitute a pair of radial detection coils, and the detection coils C5 and C7 constitute another pair of radial detection coils.

Note that, in the present invention, the detection coils C5 and C7 may constitute a pair of radial detection coils, and the detection coils C1 and C3 may constitute another pair of radial detection coils.

When the front side of the rotor 36 is displaced from the initial position in the radial direction, the signal level of the harmonic component increases on the side where the rotor 36 approaches (e.g., at the detection coil C1) and decreases on the side from which the rotor 36 moves farther away (e.g., at the detection coil C3) among the pair of detection coils C1 and C3. In this case, since the relative movement distance of the rotor 36 with respect to the detection coils C1 and C3 is the same, the increase amount of the signal level is the same as the decrease amount. In contrast, the signal level of the fundamental component does not increase or decrease. Thus, when each detection signal of the detection coils C1 and C3 is combined so as to take (generate) the difference, in the combined signal (hereinafter referred to as "combined signal C1C3"), the difference in the signal level of the harmonic component increases depending on the increase in the displacement amount. Due to this difference, the amount of displacement of the rotor 36 in the radial direction on the front side is detectable. That is, the difference indicates the amount of wear of the bearing 32 in the radial direction, and the value of the difference is represented by a voltage value. Similarly, in a combined signal of each detection signal of the detection coils C5 and C7 (hereinafter referred to as "combined signal C5C7"), a difference in the signal level of the harmonic component increases depending on an increase in the displacement amount. Due to this difference, the amount of displacement of the rotor 36 in the radial direction on the rear side is detectable. That is, the difference indicates the amount of wear of the bearing 33 in the radial direction, and the value of the difference is represented by a voltage value. Accordingly, for example, when there is no displacement of the rotor 36 in the radial direction, the fundamental component and the harmonic component cancel each other out in each combined signal (C1C3, C5C7), and the voltage value thereof is approximately "0". In contrast, when there is displacement of the rotor 36 in the radial direction, the difference between the harmonic components increases depending on the amount of displacement in each combined signal (C1C3, C5C7), and the voltage value increases depending on the difference. The detection coils C1 and C3 are independent of the detection coils C5 and C7, and thus the uneven wear of the bearings 32 and 33 (a state where one bearing is more worn than the other bearing) is detectable by comparing the values of the combined signal C1C3 and the combined signal C5C7. The signal indicating the difference between each detection signal of the detection coils C1 and C3 (i.e., the combined signal C1C3) is an example of a first difference signal in the present invention, and the signal indicating the difference between each detection signal of the detection coils C5 and C7 (i.e., the combined signal C5C7) is an example of a second difference signal in the present invention.

The detection coils C2, C4, C6, and C8 are able to detect the amount of displacement of the rotor 36 in the thrust direction (i.e., the amount of wear of the bearings 32 and 33 in the thrust direction) by detecting the change in the magnetic flux corresponding to the displacement of the rotor 36 in the thrust direction due to an increase in the gap (L1) between the bearing 32 and the thrust washer 34 and between the bearing 33 and the thrust washer 35. The detection coils C2 and C4 constitute a pair of thrust detection coils and are connected so that detection signals thereof are superimposed on each other. Thus, the detection signals from the detection coils C2 and C4 are combined so as to be superimposed, and a combined signal C2C4 is generated. The detection coils C6 and C8 constitute another pair of thrust detection coils and are connected so that the detection signals thereof are superimposed on each other. Thus, the detection signals from the detection coils C6 and C8 are combined so as to be superimposed, and a combined signal C6C8 is generated.

Figure 8:
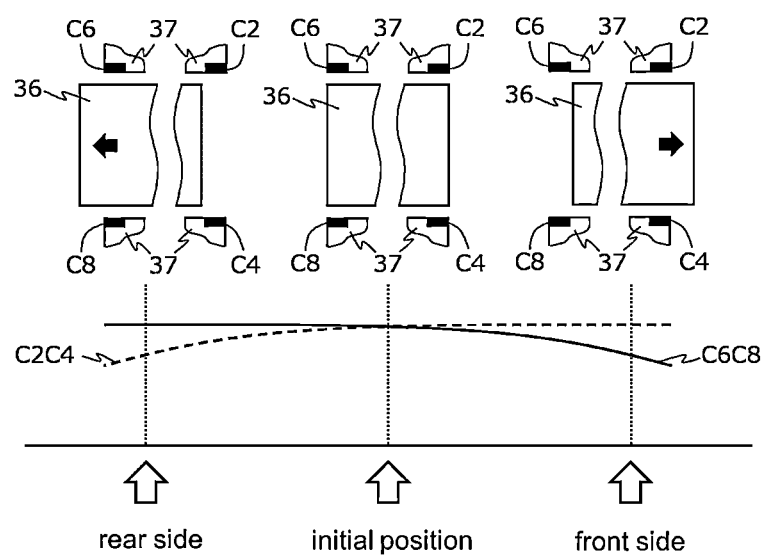
FIG. 8 is a schematic diagram illustrating a relation between a position of a rotor with respect to a stator in a thrust direction included in the motor unit in FIG. 2 and a combined signal obtained by combining two detection signals.

FIG. 8 is a schematic diagram illustrating a relation between a position of the rotor 36 with respect to the stator 37 in the thrust direction and each combined signal (C2C4, C6C8). In the figure, the vertical axis indicates an output voltage (a signal level), and the horizontal axis indicates the position of the rotor 36 in the thrust direction.

When the rotor 36 is displaced from the initial position to the rear side, an overlap between the detection coils C2 and C4 and the rotor 36 decreases in the thrust direction, but an overlap between the detection coils C6 and C8 and the rotor 36 does not change. As a result, the signal level of the fundamental component of the combined signal C2C4 decreases, but the signal level of the fundamental component of the combined signal C6C8 hardly changes. Similarly, when the rotor 36 is displaced from the initial position to the front side, the signal level of the fundamental component of the combined signal C6C8 decreases, but the signal level of the fundamental component of the combined signal C2C4 hardly changes. Thus, the amount of displacement of the rotor 36 in the thrust direction is detectable by combining the combined signal C2C4 and the combined signal C6C8 to obtain a difference therebetween. That is, the difference indicates the amount of displacement of the rotor 36 in the thrust direction, i.e., the amount of wear of the bearings 32 and 33 in the thrust direction, and the value of the difference is represented by a voltage value. Accordingly, for example, when there is no displacement of the rotor 36 in the thrust direction, the fundamental component and the harmonic component cancel each other out in the difference, and the voltage value thereof is approximately "0". In contrast, when there is displacement of the rotor 36 in the thrust direction, the difference of the fundamental component increases depending on the amount of the displacement, and the voltage value increases depending on the increase in the difference. Herein, when the signal level decreases, the detection coils C2, C4, C6, and C8 are influenced by the magnetic flux-density distribution from the end portions of the rotor 36. Thus, the change in the voltage value with respect to the displacement of the rotor 36 does not change linearly, but changes in a slightly upwardly convex curve shape. A signal indicating the difference between the combined signal C2C4 and the combined signal C6C8 (a difference signal Sd described later) is an example of a thrust difference signal in the present invention.

The figure mainly referred to in the present description return to FIG. 4. The connection 50 is an interface to which the detection coils C1 to C8 are connected.

The filter circuits 51a 51b, 51c, and 51d perform predetermined filtering processing to the detection signals of the corresponding detection coils C1, C3, C5, and C7, respectively. The filter circuits 51a to 51d are, for example, band-pass filters having a pass band (e.g., 30 Hz to 2 kHz) that allows the fundamental component and the harmonic component to pass through. The filter circuit 51a is connected to the detection coil C1, the signal processing circuit 52a, and a rectifier circuit 531 described later. The filter circuit 51b is connected to the detection coil C3, the signal processing circuit 52a, and a rectifier circuit 532 described later. The filter circuit 51c is connected to the detection coil C5, the signal processing circuit 52b, and a rectifier circuit 533 described later. The filter circuit 51d is connected to the detection coil C7, the signal processing circuit 52b, and a rectifier circuit 534 described later.

The signal processing circuits 52a and 52b include a difference amplifier circuit, a rectifier circuit, and an integrating circuit, for example. The signal processing circuit 52a generates the combined signal C1C3 indicating a difference between each detection signal of the pair of detection coils C1 and C3, performs predetermined signal processing (rectifying, AC-DC conversion) to the combined signal C1C3, and converts the combined signal C1C3 from alternating current to direct current. The signal processing circuit 52b generates the combined signal C5C7 indicating a difference between each detection signal of the pair of detection coils C5 and C7, performs predetermined signal processing (rectifying, AC-DC conversion) to the combined signal C5C7, and converts the combined signal C5C7 from alternating current to direct current.

The signal processing circuits 52c and 52d include a filter circuit, a rectifier circuit, and an integrating circuit, for example. The filter circuit is a low-pass filter having a cutoff frequency (e.g., 120 Hz) that allows the fundamental component to pass through. The signal processing circuit 52c is connected to the detection coils C2 and C4, and the signal processing circuit 52d is connected to the detection coils C6 and C8. The signal processing circuits 52c and 52d perform predetermined signal processing (filtering processing, rectifying, and AC-DC conversion) to the corresponding combined signals C2C4 and C6C8, respectively, and convert the combined signals C2C4 and C6C8 from alternating current to direct current.

The signal generation unit 53 generates a signal indicating the amplitude of the fundamental component (hereinafter referred to as "amplitude signal Sa1"), based on the detection signal of each of the detection coils C1, C3, C5, and C7. The signal generation unit 53 includes the rectifier circuits 531, 532, 533, and 534, integrating circuits 535, 536, 537, and 538, and an adding circuit 539. Herein, the integrating circuits 535 to 538 are smoothing circuits that perform averaging processing to the detection signals rectified by the corresponding rectifier circuits 531 to 534 and average the detection signals to direct current. The amplitude signal Sa1 is an example of a first amplitude signal in the present invention.

The rectifier circuit 531 and the integrating circuit 535 convert the detection signal of the detection coil C1 from alternating current to direct current. The rectifier circuit 532 and the integrating circuit 536 convert the detection signal of the detection coil C3 from alternating current to direct current. The rectifier circuit 533 and the integrating circuit 537 convert the detection signal of the detection coil C5 from alternating current to direct current. The rectifier circuit 534 and the integrating circuit 538 convert the detection signal of the detection coil C7 from alternating current to direct current. In this case, each detection signal is averaged and is a signal indicating the signal level (the amplitude) of the fundamental component. The adding circuit 539 adds up the DC signals of the integrating circuits 535 to 538 and generates the amplitude signal Sa1.

As described above, the amount of increase (the amount of decrease) in the signal level of the harmonic component of the detection signal of the detection coil C1 is the same as the amount of decrease (the amount of increase) in the signal level of the harmonic component of the detection signal of the detection coil C3. Similarly, the amount of increase (the amount of decrease) in the signal level of the harmonic component of the detection signal of the detection coil C5 is the same as the amount of decrease (the amount of increase) in the signal level of the harmonic component of the detection signal of the detection coil C7. Thus, when the DC signals of these detection signals are added up and the amplitude signal Sa1 is generated, the increase and decrease in the signal level of the harmonic component indicating the displacement of the rotor 36 in the radial direction is canceled out in the amplitude signal Sa1. That is, the amplitude signal (Sa1) functions as information indicating the amplitude of the fundamental component that does not include the displacement information of the rotor 36 in the radial direction. In the present embodiment, the amplitude signal Sa1 is the sum of the four detection signals, and the signal level thereof is about 4 times the signal level of the detection signal. That is, the signal level (the amplitude) of the amplitude signal Sa1 is proportional to the signal level (the amplitude) of the fundamental component. As described above, the signal level of the fundamental component fluctuates in proportion to the fluctuation of the driving condition. Thus, the present device 5 is able to indirectly detect the fluctuation of the driving condition (i.e., the current driving frequency), based on the fluctuation of the signal level of the amplitude signal Sa1 by retrieving the amplitude signal Sa1.

The A/D converter 54 is connected to the signal processing circuits 52a to 52d, the signal generation unit 53, and the offset processing unit 59, converts an analog signal input from each of the circuits and the units into a digital signal, and outputs the digital signal to the controller 55.

The controller 55 controls the operation of the whole present device 5. The controller 55 includes, for example, a processor such as a central processing unit (CPU) 55a, a volatile memory such as a random access memory (RAM) 55b that functions as a working area for the CPU 55a, and a non-volatile memory such as a read only memory (ROM) 55c that stores various kinds of information such as the present estimation program and other control programs. The controller 55 includes a retrieval unit 550, an estimation unit 551, and a display control unit 552.

In the controller 55, the present estimation program operates, and the present estimation program cooperates with the hardware resources of the present device 5 and achieves the present method described later. The processor (CPU 55a) included in the controller 55 is allowed to execute the present estimation program, and thus the present estimation program enables the processor to function as the retrieval unit 550, the estimation unit 551, and the display control unit 552 and enables the processor to execute the present method. Similarly, a computer is allowed to execute the present estimation program, and thus the present estimation program enables the computer to function as the present device 5.

Note that, in the present invention, the present estimation program may be stored in the storage 56. The present estimation program may be stored in an installable file format or a non-transitory storage medium, e.g., a compact disc (CD), a digital versatile disc (DVD), a universal serial bus (USB) memory, etc., in an executable file format and provided to the present device 5 via a dedicated reading medium.

The retrieval unit 550 retrieves the signal indicating the difference between each detection signal of a pair of detection coils C1 and C3 (the combined signal C1C3), the signal indicating the difference between each detection signal of another pair of detection coils C5 and C7 (the combined signal C5C7), the signal indicating the difference between the combined signal C2C4 and the combined signal C6C8 (the difference signal Sd described later), and the amplitude signal Sa1. A specific operation of the retrieval unit 550 will be described later.

The estimation unit 551 estimates a radial wear state described later by inputting the combined signals C1C3 and C5C7 and the amplitude signal Sa1 retrieved by the retrieval unit 550 into a first learning model M11, and estimates a thrust wear state described later by inputting the difference signal Sd and the amplitude signal Sa1 retrieved by the retrieval unit 550 into a second learning model M12. A specific operation of the estimation unit 551, the first learning model M11, and the second learning model M12 will be described later.

The display control unit 552 controls display of the wear state in the display 57, based on the wear state estimated by the estimation unit 551.

The storage 56 stores information necessary for the operation of the present device 5 (e.g., the first learning model M11, the second learning model M12, offset information, etc.). The storage 56 is a non-volatile memory such as an electrically erasable programmable read-only memory (EEPROM) or a flash memory, for example.

Figure 9:
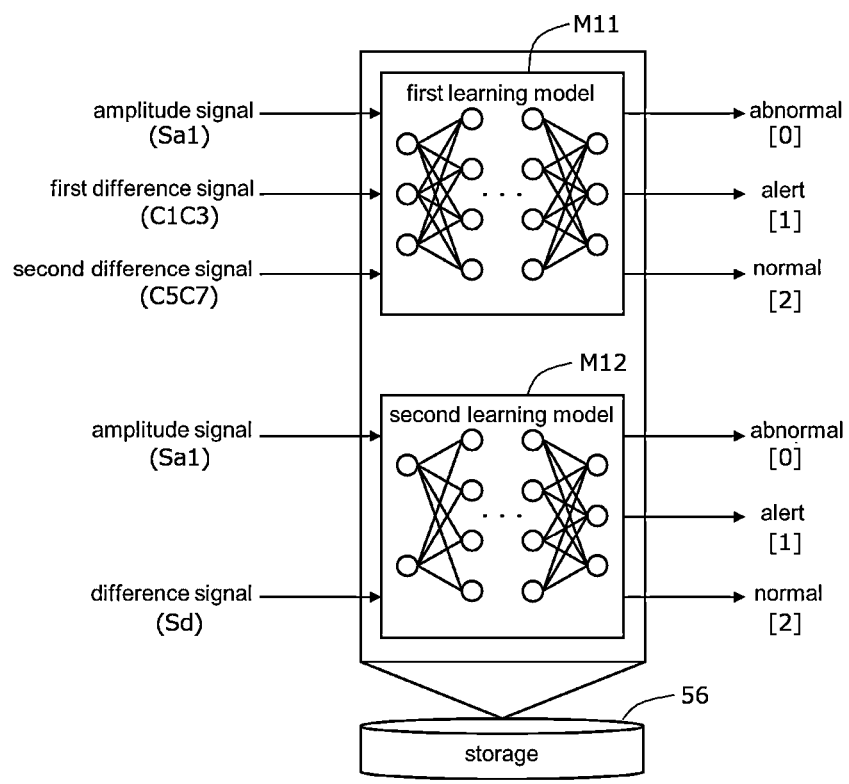
FIG. 9 is a schematic diagram illustrating an example of information stored in a storage included in the motor bearing wear state estimation device in FIG. 4.

FIG. 9 is a schematic diagram illustrating an example of the information (the first learning model M11, the second learning model M12) stored in the storage 56.

The "first learning model M11" is a learned machine learning algorithm (i.e., a learning model) that is machine-learned in such a way as to output the wear state of the bearings 32 and 33 in the radial direction (hereinafter referred to as "radial wear state") when the combined signals C1C3 and C5C7 and the amplitude signal Sa1 are input. The first learning model M11 is generated in advance by a machine learning device 6 described later, for example, and stored in the storage 56.

The "second learning model M12" is a learned learning model that is machine-learned in such a way as to output the wear state of the bearings 32 and 33 in the thrust direction (hereinafter referred to as "thrust wear state") when the difference signal Sd and the amplitude signal Sa1 are input. The second learning model M12 is generated in advance by the machine learning device 6 described later, for example, and stored in the storage 56.

The "offset information" is information (e.g., a voltage value) indicating an offset voltage to be added to or subtracted from the combined signal C2C4 in the offset processing. The offset information is measured or set in advance prior to the shipment of the present pump 1 under a predetermined reference driving condition (e.g., driving frequency of 60 Hz, driving voltage of 200 V), for example, and is stored in the storage 56.

The "offset processing" means processing for adding or subtracting the offset voltage to or from the combined signal C2C4 in such a way that a difference value between the combined signal C2C4 and the combined signal C6C8 correctly indicates an amount of displacement of the rotor 36 in the thrust direction (the amount of wear of the bearings 32 and 33 in the thrust direction) in the reference driving condition. Due to the offset processing, the magnetic center position of the rotor 36 with respect to the stator 37 in the thrust direction is virtually aligned with the mechanical center position of the rotor 36 with respect to the stator 37 in the thrust direction (both center positions coincide with each other).

Figure 10:
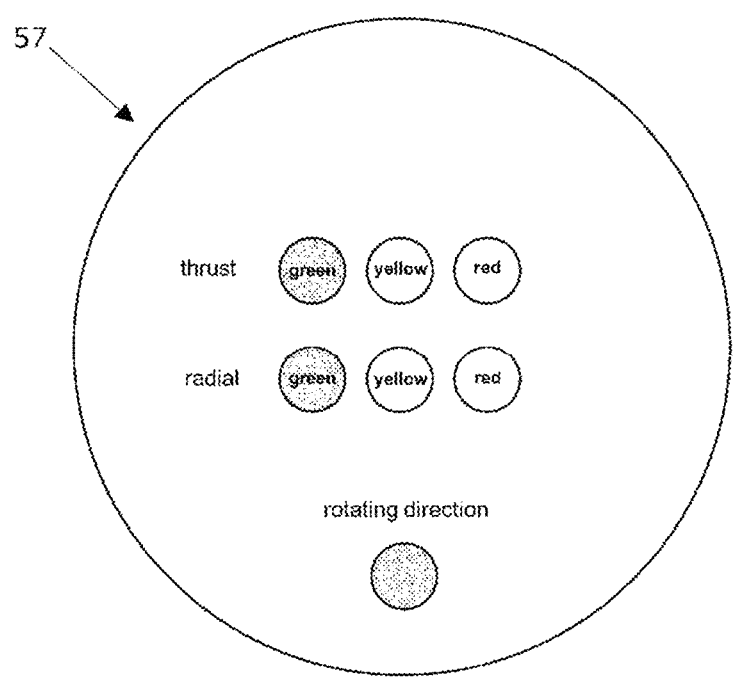
FIG. 10 is a schematic diagram illustrating an appearance of a display included in the motor bearing wear state estimation device in FIG. 4.

FIG. 10 is a schematic diagram illustrating an appearance of the display 57.

The display 57 displays the wear state and the rotating direction of the bearings 32 and 33. The display 57 includes a plurality of light emitting diodes (LED) that displays the radial wear state, the thrust wear state, and the rotating direction, for example. The display 57 displays the wear state in the radial direction and the thrust direction in three stages of "green", "yellow", and "red", and displays the rotating direction in lighting-on (normal rotation) and lighting-off (reverse rotation).

The figure mainly referred to in the present description return to FIG. 4. The D/A converter 58 converts the offset information input from the controller 55 from a digital signal to an analog signal and transmits the converted analog signal to the offset processing unit 59.

The offset processing unit 59 performs the offset processing, based on the offset information. The offset processing unit 59 includes, for example, an offset voltage generation circuit, an arithmetic circuit, and a difference absolute value conversion circuit (all not illustrated). The offset processing unit 59 generates an offset voltage, based on the offset information in the offset voltage generation circuit, and performs the offset processing to the combined signal C2C4 by adding or subtracting the offset voltage to or from the combined signal C2C4 in the arithmetic circuit. The offset processing unit 59 calculates (generates) a difference value between the combined signal C2C4 after the offset processing in the arithmetic circuit and the combined signal C6C8, and converts the difference value into an absolute value in the difference absolute value conversion circuit. A signal indicating this absolute value (hereinafter referred to as "difference signal Sd") is converted into a digital signal by the A/D converter 54 and input to the controller 55.

Machine Learning Device

Next, the machine learning device 6 that generates the first learning model M11 and the second learning model M12 will be described below.

Configuration of Machine Learning Device

Figure 11:
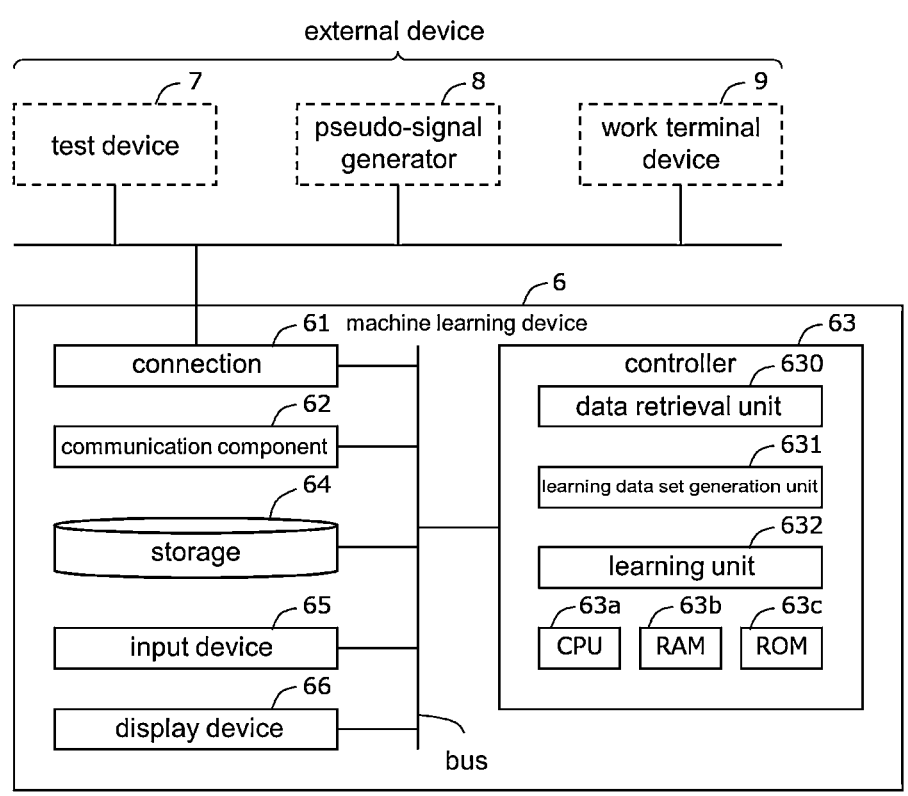
FIG. 11 is a functional block diagram of a machine learning device in the present invention.

FIG. 11 is a functional block diagram of the machine learning device 6 in the present invention. In the figure, external devices described later are also illustrated for convenience of description.

The machine learning device 6 is constituted of a personal computer, for example. The machine learning device 6 includes a connection 61, a communication component 62, a controller 63, a storage 64, an input device 65, and a display device 66.

The connection 61 is, for example, a known interface including a terminal connected to an external device.

The "external device" is a device that is connected to the machine learning device 6 and generates learning data retrieved by the machine learning device 6. The external devices are, for example, a test device 7 imitating the present pump 1, a pseudo-signal generator 8 that generates a pseudo signal of the signal obtained in the present pump 1, a work terminal device 9 used by a worker who generates a learning model by using the machine learning device 6, and the like.

The communication component 62 is connected to a communication network line (e.g., a wireless communication line such as the Internet or an intranet), for example, and transmits and receives information to and from another computer and the like.

The controller 63 controls the operation of the whole machine learning device 6. The controller 63 includes, for example, a processor such as a CPU 63a, a volatile memory such as RAM 63b that functions as a working area for the CPU 63a, and a non-volatile memory such as a ROM 63c that stores various kinds of information such as a machine learning program and other control programs. The controller 63 includes a data retrieval unit 630, a learning data set generation unit 631, and a learning unit 632.

In the controller 63, the machine learning program operates, and the machine learning program cooperates with the hardware resources of the machine learning device 6 and achieves a machine learning method described later. The processor (the CPU 63a) included in the controller 63 is allowed to execute the machine learning program, and thus the machine learning program enables the processor to function as the data retrieval unit 630, the learning data set generation unit 631, and the learning unit 632 and enables the processor to execute the machine learning method. Similarly, the computer is allowed to execute the machine learning program, and thus the machine learning program enables the computer to function as the machine learning device 6.

Note that, in the present invention, the machine learning program may be stored in the storage 64. The machine learning program may be stored in an installable file format or a non-transitory storage medium (e.g., a CD, a DVD, a USB memory, etc.) in an executable file format and provided to the machine learning device 6 via a dedicated reading medium.

The data retrieval unit 630 retrieves the learning data from the external devices via the connection 61.

The "learning data" includes information that is input data for the learning model and information that is output data (training data) for the learning model.

The "input data" is an explanatory variable in the machine learning and is the combined signal C1C3: the first difference signal, the combined signal C5C7: the second difference signal, the difference signal Sd: the thrust difference signal, and the amplitude signal Sa1: the first amplitude signal in a predetermined state (a predetermined driving condition, a predetermined wear state, a predetermined period) in the present embodiment. Specifically, the input data is a voltage value obtained from each signal, for example. As described above, the combined signals C1C3 and C5C7 indicate the amount of displacement (the amount of wear) of the bearings 32 and 33 in the radial direction, i.e., the radial wear state. The difference signal Sd indicates the amount of displacement (the amount of wear) of the bearings 32 and 33 in the thrust direction, i.e., the thrust wear state. The signal level (the voltage value) of the amplitude signal Sa1 is proportional to the driving conditions (the driving frequency, the driving voltage). The voltage values of the combined signals C1C3 and C5C7 and the difference signal Sd increase and decrease depending on an increase and decrease in the driving conditions. That is, the voltage values of each combined signal (C1C3, C5C7) and the difference signal Sd increase and decrease depending on an increase and decrease in the amplitude signal Sa1.

Accordingly, there is a correlation of each combined signal (C1C3, C5C7) and the difference signal Sd with the amplitude signal Sa1. When the displacement amount of the bearings 32 and 33 increases (the wear state deteriorates), the voltage values of each combined signal (C1C3, C5C7) and the difference signal Sd increase. That is, as the voltage values of each combined signal (C1C3, C5C7) and the difference signal Sd increase, the wear condition of the bearings 32 and 33 deteriorates (the amount of wear increases). Accordingly, there is a correlation of each combined signal (C1C3, C5C7) and the difference signal Sd with the wear condition of the bearings 32 and 33. When the driving frequency (i.e., the amplitude signal Sa1) is changed, the amount of displacement (the amount of wear), i.e., the wear state, indicated by each combined signal (C1C3, C5C7) and the difference signal Sd varies (see also the description in FIG. 16 for details). Accordingly, there is a correlation of the amplitude signal Sa1 and the wear state of the bearings 32 and 33. In this way, there is a correlation between the input data and the output data. The input data is, for example, each signal (a voltage value) obtained during a predetermined period when the test device 7 is operated under a predetermined driving condition and a predetermined wear state. The input data is, for example, a pseudo signal (a voltage value) generated by the pseudo-signal generator 8 within a predetermined period, based on actual data (e.g., log data) obtained in the past in a pump of the same model as the present pump 1. The data retrieval unit 630 retrieves, as the input data, the combined signal C1C3, the combined signal C5C7, the difference signal Sd, and the amplitude signal Sa1 from the test device 7 and/or the pseudo-signal generator 8.

Herein, the "predetermined driving condition" is a driving frequency between 40 Hz and 60 Hz, for example. The predetermined driving condition is set in a few Hz (e.g., 5 Hz) step. The "predetermined wear state" is made, for example, by artificially moving a position of the rotor 36 (the rotating shaft 31) so that the combined signals C1C3 and C5C7 and the difference signal Sd indicate each wear state of "normal", "alert", and "abnormal". The "predetermined period" is a time (e.g., several seconds to several tens of seconds) for obtaining a signal that can be used as the learning data in the predetermined driving condition and the predetermined wear state.

The "output data" is a response variable in the machine learning and is information indicating the wear state of the bearings 32 and 33 in the present embodiment. In the present embodiment, the "wear state" includes three states: "normal" indicating a (mild) wear state to the extent that the bearings 32 and 33 do not have to be replaced; "alert" indicating a (moderate) wear state to the extent that the bearings 32 and 33 are urged to be replaced; and "abnormal" indicating a (severe) wear state to the extent that the bearings 32 and 33 need to be replaced. The wear state includes the radial wear state and the thrust wear state. The wear state is determined by a worker as a wear state corresponding to the input data for each input data. The determination result is input to the work terminal device 9 by the worker as output data corresponding to the input data and stored in the work terminal device 9. In this case, the output data is associated with information (e.g., an ID for each input data, information indicating a generation period of the input data, and the like) that can be associated with the input data used by the worker to determine the wear state. The data retrieval unit 630 retrieves the wear state from the work terminal device 9 as the output data. In this case, a numerical value such as "0", "1", and "2" is assigned to each wear state, for example.

Note that, in the present invention, the radial wear state and the thrust wear state may be collectively determined for each input data, or the radial wear state corresponding to the combined signals C1C3 and C5C7 and the amplitude signal Sa1 of the input data and the thrust wear state corresponding to the difference signal Sd and the amplitude signal Sa1 of the input data may be individually determined.

In the present invention, the output data is not limited to the three states. That is, for example, the output data may be only in two states: "normal" and "abnormal". For example, the output data may include a plurality of "normal" and/or "alert" divided into several stages (e.g., three stages) depending on the progress of the wear state.

The learning data set generation unit 631 generates one or more learning data sets, based on the learning data retrieved by the data retrieval unit 630. The learning data set generation unit 631 generates the learning data set by associating, for example, the input data in the predetermined period with the output data corresponding to the input data. The generated learning data set is stored in the storage 64.

The learning unit 632 performs the machine learning on the learning model (builds the learning model) by using the learning data set generated by the learning data set generation unit 631. The machine learning performed by the learning unit 632 is executed by using a known machine learning algorithm (e.g., a neural network having an input layer, a plurality of intermediate layers, and an output layer).

Note that, in the present invention, the machine learning algorithm used by the learning unit 632 may be such that the learning model generated by the machine learning using the learning data set is able to estimate the wear state and is not limited to a neural network. That is, for example, the learning unit 632 may use a random forest, a decision tree, a support vector machine, or the like.

The storage 64 stores information necessary for the operation of the machine learning device 6 (the learning data, the learning data set for the learning model to learn, the learned learning model such as the first learning model M11 and the second learning model M12). The storage 64 is a storage device such as a solid state drive (SSD) and a hard disk drive (HDD), for example.

The input device 65 is a device (e.g., a keyboard, a mouse, etc.) that accepts an input operation by a user of the machine learning device 6, for example.

The display device 66 is a device (e.g., a monitor, a liquid crystal display, etc.) that displays information toward a worker and the like, for example.

Note that, in the present invention, the input device 65 and the display device 66 may be implemented by a touch panel type display, for example.

Operation of Machine Learning Device

Next, operations (a machine learning method) of the machine learning device 6 will be described.

Figure 12:
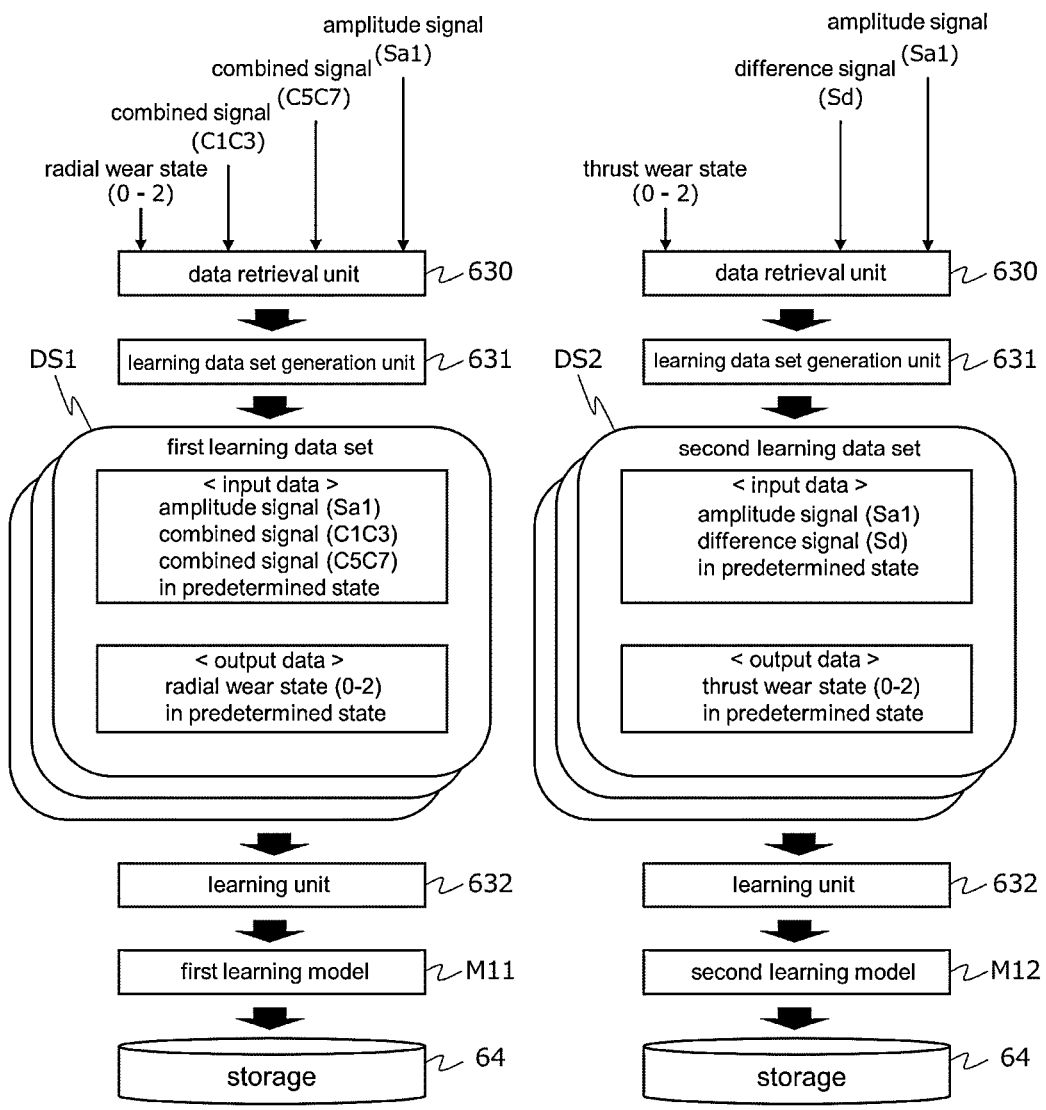
FIG. 12 is a schematic diagram illustrating a machine learning method performed in the machine learning device in FIG. 11.

FIG. 12 is a schematic diagram illustrating the machine learning method executed in the machine learning device 6.

First, the data retrieval unit 630 retrieves the input data in the predetermined state (the predetermined period, the predetermined wear state) from the external device (e.g., the test device 7). Then, the data retrieval unit 630 retrieves, from the work terminal device 9, the output data corresponding to the retrieved input data. The retrieved input data is associated with the corresponding output data and is stored in the storage 64.

Then, the learning data set generation unit 631 generates the learning data set, based on the input data and the output data that are retrieved by the data retrieval unit 630. Specifically, the learning data set generation unit 631 generates one or more learning data sets (hereinafter referred to as "first learning data set DS1") corresponding to the radial wear state by associating the combined signals C1C3 and C5C7 and the amplitude signal Sa1 in the predetermined state (the predetermined operation condition, the predetermined wear state, the predetermined period) with the radial wear state. The learning data set generation unit 631 generates one or more learning data sets (hereinafter referred to as "second learning data set DS2") corresponding to the thrust wear state by associating the difference signal Sd and the amplitude signal Sa1 in the predetermined state (the predetermined period, the predetermined wear state) with the thrust wear state. That is, the learning data set includes the first learning data set DS1 and the second learning data set DS2. The generated learning data set is stored in the storage 64.

Herein, the number of learning data sets to be generated is appropriately set according to estimation accuracy of the generated learning models (the first learning model M11, the second learning model M12).

Then, the learning unit 632 causes a known machine learning algorithm to repeatedly machine-learn the learning data sets, thereby generating (building) a learning model. Specifically, the learning unit 632 causes the machine learning algorithm to machine-learn a plurality of types of first learning data sets DS1, thereby generating the first learning model M11. The learning unit 632 causes the machine learning algorithm to machine-learn a plurality of types of second learning data sets DS2, thereby generating the second learning model M12. A specific machine learning method is known, and the description of the specific description thereof is omitted. The generated first learning model M11 and the second learning model M12 are stored in the storage 64.

The first learning model M11 generated in this way is able to output the radial wear state corresponding to the driving condition by inputting the combined signals C1C3 and C5C7 and the amplitude signal Sa1 as the input data. That is, the first learning model M11 is machine-learned in such a way as to output the radial wear state corresponding to the driving condition (obtained from the amplitude signal Sa1) when the combined signals C1C3 and C5C7 and the amplitude signal Sa1 are input as the input data. Similarly, the second learning model M12 is machine-learned in such a way as to output the thrust wear state corresponding to the driving condition (obtained from the amplitude signal Sa1) when the difference signal Sd and the amplitude signal Sa1 are input as the input data.

Operation of Canned Motor Pump (Motor Bearing Wear State Estimation Device 1)

Next, operations of the present pump 1 (i.e., the present method) will be described below with a focus on operations of the present device 5. In the following description, FIGS. 1 to 12 will be referred to as necessary.

Figure 13:
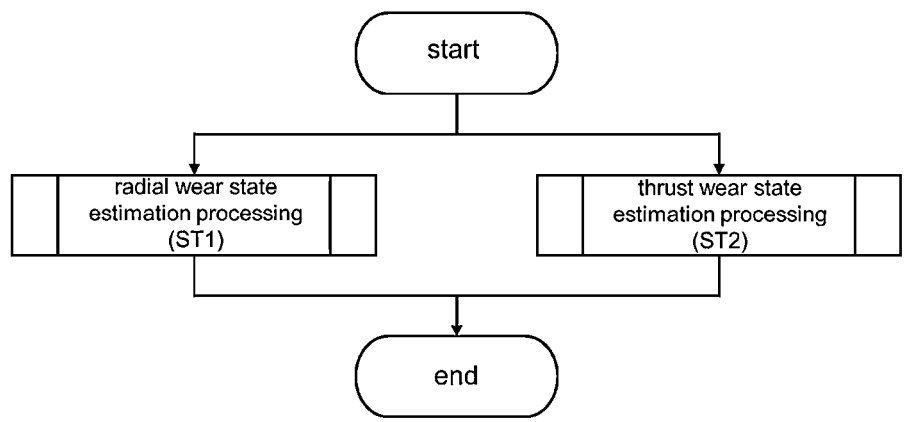
FIG. 13 is a flowchart illustrating an example of an operation of the motor bearing wear state estimation device in FIG. 4.

FIG. 13 is a flowchart illustrating an example of the operations of the present device 5.

When the present pump 1 is in operation, the motor unit 3 is powered under a predetermined driving condition, and the rotor 36, the rotating shaft 31, and the impeller 21 are rotating at a predetermined number of revolutions. In this case, the present device 5 repeatedly executes the radial wear state estimation processing ST1 and the thrust wear state estimation processing ST2 on a regular basis (e.g., every few seconds).

Radial Wear State Estimation Processing

Figure 14:
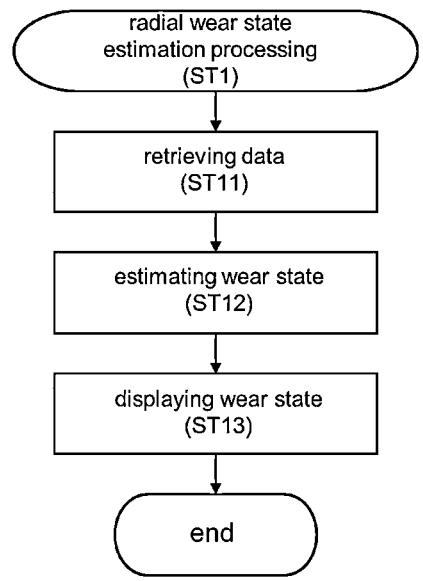
FIG. 14 is a flowchart illustrating an example of radial wear state estimation processing included in the operation in FIG. 13.

FIG. 14 is a flowchart illustrating an example of the radial wear state estimation processing ST1.

The "radial wear state estimation processing ST1" is processing in which the present device 5 retrieves the input data (the combined signals C1C3 and C5C7 and the amplitude signal Sa1) and estimates the radial wear state when the present pump 1 is in operation. The radial wear state estimation processing ST1 is an example of the present method.

First, the retrieval unit 550 retrieves the combined signals C1C3 and C5C7 and the amplitude signal Sa1 as the input data (ST11: retrieving step). The retrieved combined signal C1C3 is a signal generated by the signal processing circuit 52a and converted into a digital signal by the A/D converter 54 and indicates a difference between each detection signal of the detection coils C1 and C3. Similarly, the retrieved combined signal C5C7 is a signal generated by the signal processing circuit 52b and converted into a digital signal by the A/D converter 54 and indicates a difference between each detection signal of the detection coils C5 and C7. The amplitude signal Sa1 is generated by the signal generation unit 53 generating a DC signal of the detection signal from each of the detection coils C1, C3, C5, and C7 and adding up all the DC signals. As described above, the amplitude signal Sa1 functions as the information indicating only the amplitude of the fundamental component that does not include the information indicating the displacement in the radial direction. The retrieved amplitude signal Sa1 is a signal converted into a digital signal in the A/D converter 54.

Then, the estimation unit 551 inputs the retrieved input data to the first learning model M11 and estimates the radial wear state, based on the output of the first learning model M11 (ST12: estimating step). That is, for example, when the output of the first learning model M11 is "normal", the estimation unit 551 estimates that the radial wear state is "normal".

Then, the display control unit 552 determines a display mode of the display 57, based on the estimated radial wear state, and controls a display on the display 57 in such a way that the display on the display 57 is performed in the determined display mode (ST13: displaying step). That is, for example, when the estimated radial wear state is "normal", the display control unit 552 causes the display 57 to turn on a "green" LED.

Thrust Wear State Estimation Processing

Figure 15:
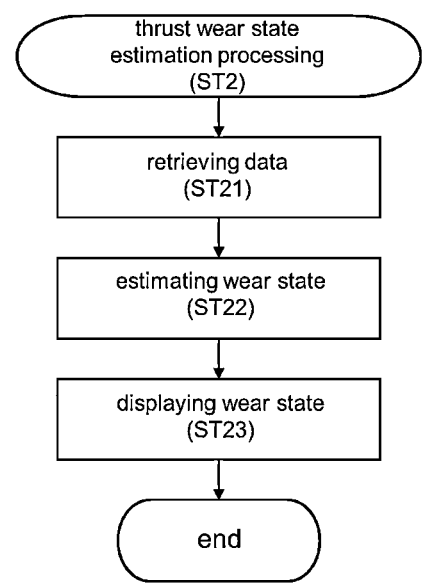
FIG. 15 is a flowchart illustrating an example of thrust wear state estimation processing included in the operation in FIG. 13.

FIG. 15 is a flowchart illustrating an example of the thrust wear state estimation processing ST2.

The "thrust wear state estimation processing ST2" is processing in which the present device 5 retrieves the input data (the difference signal Sd and the amplitude signal Sa1) and estimates the thrust wear state when the present pump 1 is in operation. The thrust wear state estimation processing ST2 is an example of the present method.

First, the retrieval unit 550 retrieves the difference signal Sd and the amplitude signal Sa1 as the input data (ST21: retrieving step). As described above, the retrieved difference signal Sd is a signal generated by the offset processing unit 59 and converted into a digital signal by the A/D converter 54 and indicates an absolute value of a difference between the combined signal C2C4 and the combined signal C6C8.

Then, the estimation unit 551 inputs the retrieved input data to the second learning model M12 and estimates the thrust wear state, based on the output of the second learning model M12 (ST22: estimating step). That is, for example, when the output of the second learning model M12 is "alert", the estimation unit 551 estimates that the thrust wear state is "alert".

Then, the display control unit 552 determines a display mode of the display 57, based on the estimated thrust wear state, and controls a display on the display 57 in such a way that the display on the display 57 is performed in the determined display mode (ST23: displaying step). That is, for example, when the estimated thrust wear state is "alert", the display control unit 552 causes the display 57 to turn on a "yellow" LED.

Figure 16A:
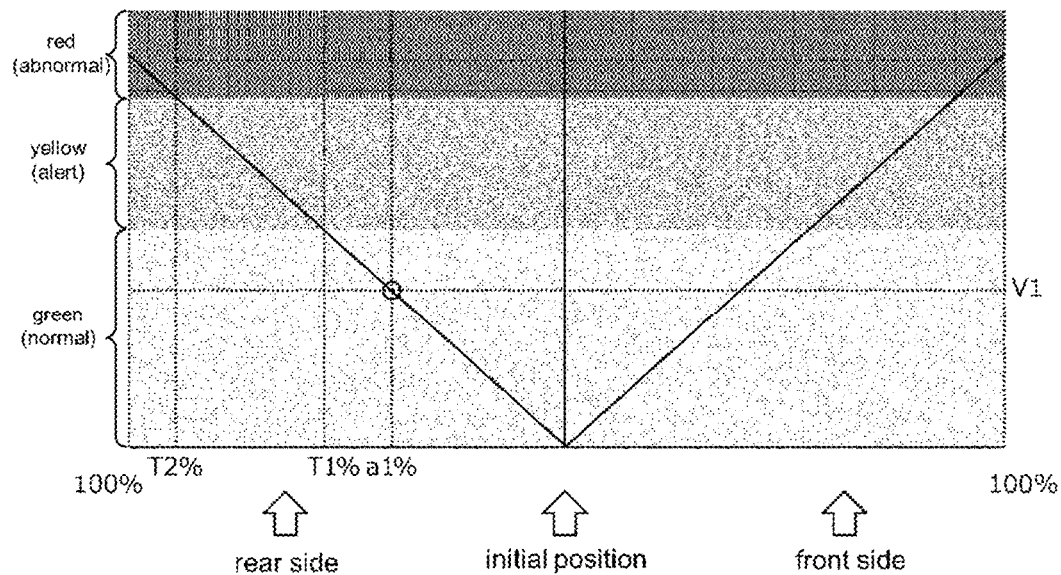
FIG. 16A illustrates the criterion before the change in the driving frequency and FIG. 16B illustrates the criterion after the change in the driving frequency.
Figure 16B:
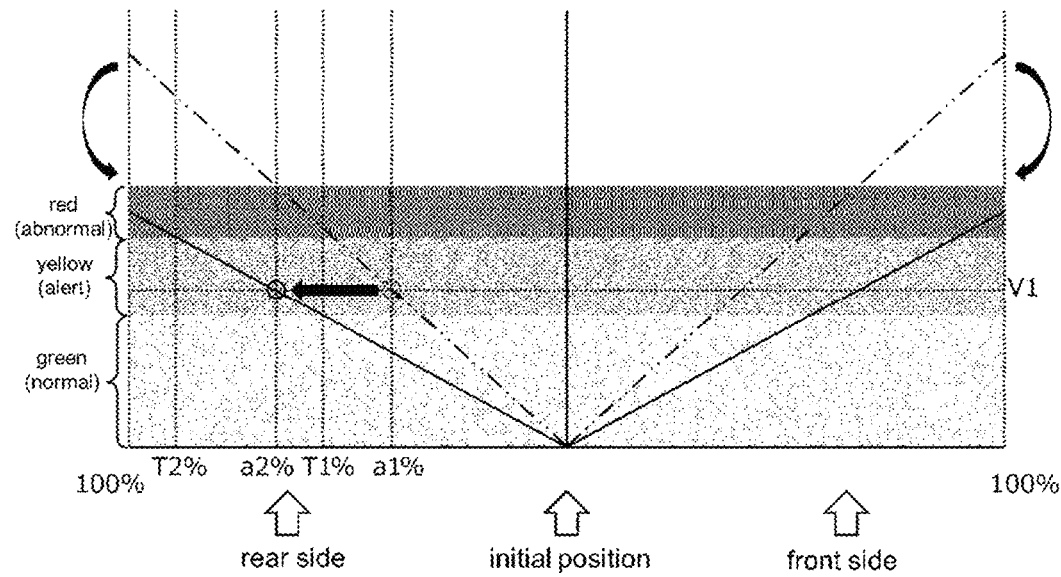

FIG. 16 is a schematic diagram illustrating a change in a criterion for determining a thrust wear state before and after a change in a driving frequency, and FIG. 16A illustrates a criterion before the change in the driving frequency and FIG. 16B illustrates a criterion after the change in the driving frequency.

In the figure, the vertical axis indicates a voltage value of the difference signal Sd, and the horizontal axis indicates the amount of wear of the bearings 32 and 33 in the thrust direction (the amount of displacement of the rotor 36 in the thrust direction). In FIG. 16A, a "V"-shaped solid line illustrates a correspondence between a voltage value and the amount of wear at the driving frequency before the change. In FIG. 16B, a "V"-shaped solid line indicates the correspondence at the driving frequency after the change, and the chain double-dashed line indicates the correspondence at the driving frequency before the change. The figures also illustrate the thrust wear state corresponding to the driving frequency in three different colors. The figures further illustrate a change in the criterion when the driving frequency is changed so as to be lowered from the state illustrated in the FIG. 16A to the state illustrated in the FIG. 16B.

The thrust wear state is determined based on the correspondence in the "V" shape, and in the example illustrated in FIG. 16, the voltage value corresponding to a predetermined amount of wear "T1%" and the voltage value corresponding to a predetermined amount of wear "T2%" are criteria for determining the thrust wear state in the correspondence. The thrust wear state is determined to be "normal" when the amount of wear is less than "T1%", is determined to be "alert" when the amount of wear is greater than or equal to "T1%" and less than "T2%", and is determined to be "abnormal" when the amount of wear is greater than or equal to "T2%". As illustrated in FIG. 16, the amounts of wear T1% and T2% that are threshold values of the wear state do not change before and after the change in the driving frequency, but the voltage value that is a threshold value of the wear state increases and decreases with an increase and decrease in the driving frequency. Thus, unless the criterion is changed depending on the change in the driving frequency, the present device 5 cannot estimate the correct thrust wear state. That is, for example, in the example illustrated in FIG. 16, when the voltage value is "V1" at the driving frequency after the change, the amount of wear is "a2%" according to the criterion (FIG. 16B) corresponding to the driving frequency, and the thrust wear state is "alert". However, the amount of wear is "a1%" according to the criterion before the change (FIG. 16A), and the thrust wear state is "normal". In order to avoid such erroneous determination, the criterion is machine-learned in the first learning model M11 and the second learning model M12 in the present invention. As a result, even though the driving condition (the driving frequency, the driving voltage) is changed, the present device 5 is able to estimate the wear state depending on the driving condition without manual operation for the device. Note that, the same applies to the radial wear state.

Conclusion 1

According to the embodiment described above, each of the plurality of detection coils C1 to C8 outputs a detection signal indicating a change in magnetic flux corresponding to a mechanical position change of the rotor 36 with respect to the stator 37. The detection coils C1 to C8 include the plurality of detection coils C1, C3, C5, and C7 that each detects a change in the magnetic flux in the radial direction and the plurality of detection coils C2, C4, C6, and C8 that each detects a change in the magnetic flux in the thrust direction. The detection signal includes a fundamental component based on a driving frequency of the motor unit 3. The present device 5 includes the retrieval unit 550, the estimation unit 551, and the storage 56. The storage 56 stores the first learning model M11 and the second learning model M12. The first learning model M11 is machine-learned in such a way as to output a radial wear state when the combined signal C1C3, the combined signal C5C7, and the amplitude signal Sa1 are input. The second learning model M12 is machine-learned in such a way as to output a thrust wear state when the difference signal Sd and the amplitude signal Sa1 are input. The amplitude signal Sa1 is generated based on each detection signal of the detection coils C1, C3, C5, and C7. According to this configuration, the present device 5 is able to estimate the wear state depending on the driving condition by using, as the input data to the learned learning model, the amplitude signal Sa1 including only the amplitude (the signal level) of the fundamental component increasing and decreasing in proportion to the increase and decrease of the driving condition, and the combined signals C1C3 and C5C7 and the difference signal Sd that indicate the amount of wear (the wear state) of the bearings 32 and 33. Accordingly, even though the driving condition is changed, the present device 5 is able to estimate the wear state depending on the driving condition without manual operation for the device.

According to the embodiment described above, the present device 5 includes the signal generation unit 53 that generates the amplitude signal Sa1, based on each detection signal of the detection coils C1, C3, C5, and C7. This configuration enables the retrieval unit 550 to retrieve the amplitude signal Sa1 that is the input data of the learning model at any timing. Accordingly, even though the driving condition is changed, the present device 5 is able to estimate the wear state depending on the driving condition without manual operation for the device.

According to the embodiment described above, the signal generation unit 53 adds up each detection signal (the DC signals) of the detection coils C1, C3, C5, and C7. According to this configuration, in the amplitude signal Sa1, all the displacement information in the radial direction on the front side and the rear side is canceled out. Thus, the estimation unit 551 is able to estimate the radial wear state and the thrust wear state depending on the driving condition without any influence from the displacement information. Accordingly, even though the driving condition is changed, the present device 5 is able to estimate the wear state depending on the driving condition without manual operation for the device.

Note that, in the embodiment described above, the signal generation unit 53 may generate an average as the amplitude signal instead of the sum of the four detection signals (the DC signals).

In the embodiment described above, the signal generation unit 53 may generate the amplitude signal Sa1 by adding up only the detection signals of the pair of detection coils C1 and C3 or may generate the amplitude signal Sa1 by adding up only the detection signals of the pair of detection coils C5 and C7. Also in this configuration, an increase and decrease in the harmonic component included in the detection signals of the pair of detection coils C1 and C3 is canceled out, and an increase and decrease in the harmonic component included in the detection signals of the other pair of detection coils C5 and C7 is canceled out. Thus, the amplitude signal Sa1 does not include the displacement information of the rotor 36, and the amplitude signal Sa1 functions as information indicating only the amplitude of the fundamental component.

In the embodiment described above, the controller 55 may function as the signal generation unit. This configuration eliminates the need for a group of circuits that constitutes the signal generation unit 53 and simplifies the circuit configuration.

In the embodiment described above, the present device 5 may also include a function as the machine learning device 6. That is, for example, the controller 55 may include the data retrieval unit 630, the learning data set generation unit 631, and the learning unit 632. In this case, for example, the data retrieval unit 630 may retrieve the input data by artificially displacing the rotor 36 (the rotating shaft 31) under various driving conditions and operating the present pump 1 prior to shipment of the present pump 1. The data retrieval unit 630 may retrieve, from the work terminal device 9, a wear state corresponding to the input data determined by a worker and input to the work terminal device 9. The present device 5 may be connected to an external device, and the data retrieval unit 630 may retrieve the learning data from the external device.

In the embodiment described above, the machine learning device 6 may generate one comprehensive learning model that functions as the first learning model M11 and the second learning model M12 by causing the learning model to machine-learn the combined signals C1C3 and C5C7, the difference signal Sd, and the amplitude signal Sa1 as the input data, and the radial wear state and the thrust wear state as the output data. In this case, the storage 56 may store the comprehensive learning model instead of the first learning model M11 and the second learning model M12, and the estimation unit 551 may estimate the wear state by using the comprehensive learning model.

In the embodiment described above, the present pump 1 need not include the present device 5. That is, for example, the detection coils C1 to C8 may be provided in the motor unit 3, and the present device 5 may be disposed apart from the pump unit 2, the motor unit 3, and the adapter 4. In this case, the present device 5 may be connected to the detection coils C1 to C8 via cable, or the present device 5 and the motor unit 3 may include a communication function and the present device 5 may be connected to the motor unit 3 via a wireless communication line and configured to be able to receive the detection signal.

Motor Bearing Wear State Estimation Device 2

Next, another embodiment (hereinafter referred to as "second embodiment") of the motor bearing wear state estimation device according to the present invention will be described with a focus on differences from the previously described embodiment (hereinafter referred to as "first embodiment"). In the second embodiment, the configuration and the method for retrieving the amplitude signal are different from those in the first embodiment. In the following description, components in common with the first embodiment are indicated with the same reference signs, and the description thereof will be omitted.

Configuration of Motor Bearing Wear State Estimation Device 2

Figure 17:
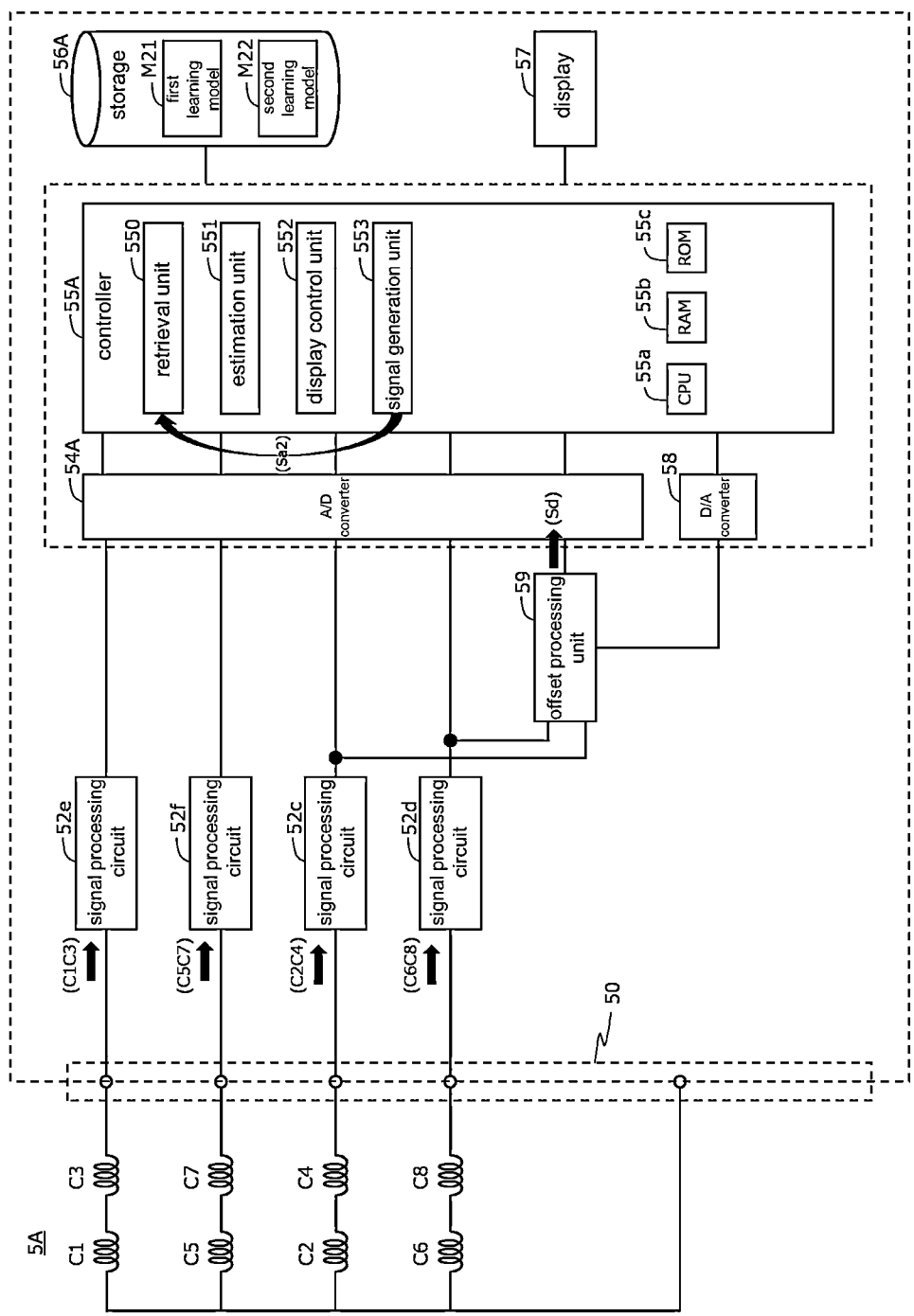
FIG. 17 is a functional block diagram illustrating another embodiment of the motor bearing wear state estimation device according to the present invention.

FIG. 17 is a functional block diagram illustrating the another embodiment (the second embodiment) of the present device.

A present device 5A includes eight detection coils C1 to C8, the connection 50, a signal processing circuits 52c, 52d, 52e, and 52f, an A/D converter 54A, a controller 55A, a storage 56A, the display 57, the D/A converter 58, and the offset processing unit 59. The A/D converter 54A, the controller 55A, and the D/A converter 58 are implemented by a microcomputer, for example.

The detection coils C1 and C3 constitute a pair of radial detection coils and are connected so that the detection signals thereof cancel each other out. The detection coils C5 and C7 constitute another pair of radial detection coils and are connected so that the detection signals thereof cancel each other out. Thus, the combined signal C1C3 of the detection coils C1 and C3 indicates a difference between each detection signal of the detection coils C1 and C3. The amount of displacement of the rotor 36 in the radial direction on the front side is detected due to the difference. That is, the difference indicates the amount of wear of the bearing 32 in the radial direction, and the value of the difference is represented by a voltage value. The combined signal C5C7 of the detection coils C5 and C7 indicates a difference between each detection signal of the detection coils C5 and C7. The amount of displacement of the rotor 36 in the radial direction on the rear side is detected due to the difference. That is, the difference indicates the amount of wear of the bearing 33 in the radial direction, and the value of the difference is represented by a voltage value.

The signal processing circuits 52e and 52f include a filter circuit, a rectifier circuit, and an integrating circuit, for example. The filter circuit is a band-pass filter having a pass band (e.g., several 100 Hz to 2 kHz) that allows harmonic components to pass through. The signal processing circuit 52e is connected to the detection coils C1 and C3, and the signal processing circuit 52f is connected to the detection coils C5 and C7. The signal processing circuits 52e and 52f perform predetermined signal processing (filtering processing, rectifying, and AC-DC conversion) to the corresponding combined signals C1C3 and C5C7, respectively, and convert the combined signals C1C3 and C5C7 from alternating current to direct current.

The A/D converter 54A is connected to the signal processing circuits 52c to 52f and the offset processing unit 59, and converts an analog signal input from each of the circuits and the unit to a digital signal and outputs the digital signal to the controller 55A.

The controller 55A controls the operation of the whole present device 5A. The controller 55A includes, for example, a processor such as the CPU 55a, a volatile memory such as the RAM 55b that functions as a work area for the CPU 55a, and a non-volatile memory such as the ROM 55c that stores various kinds of information such as the present estimation program and other control programs. The controller 55A includes the retrieval unit 550, the estimation unit 551, the display control unit 552, and a signal generation unit 553.

In the controller 55A, the present estimation program operates, and the present estimation program cooperates with the hardware resources of the present device 5A and achieves the present method described later. The processor (the CPU 55a) included in the controller 55A is allowed to execute the present estimation program, and thus the present estimation program enables the processor to function as the retrieval unit 550, the estimation unit 551, the display control unit 552, and the signal generation unit 553 and enables the processor to execute the present method. The computer is allowed to execute the present estimation program, and thus the present estimation program enables the computer to function as the present device 5A.

The signal generation unit 553 generates an amplitude signal Sa2, based on the combined signal C2C4 and the combined signal C6C8. A specific operation of the signal generation unit 553 will be described later.

The amplitude signal Sa2 hardly includes the displacement information of the rotor 36 in the thrust direction, and functions as information indicating the amplitude of the fundamental component similarly to the amplitude signal Sa1. In the second embodiment, the amplitude signal Sa2 is generated based on the combined signal C2C4 and the combined signal C6C8. A method of generating the amplitude signal Sa2 will be described later. The amplitude signal Sa2 is an example of a second amplitude signal in the present invention.

The storage 56A stores information necessary for the operation of the present device 5A (e.g., a first learning model M21, a second learning model M22, offset information, etc.). The storage 56A is a non-volatile memory such as an electrically erasable programmable read-only memory (EEPROM) or a flash memory, for example.

Figure 18:
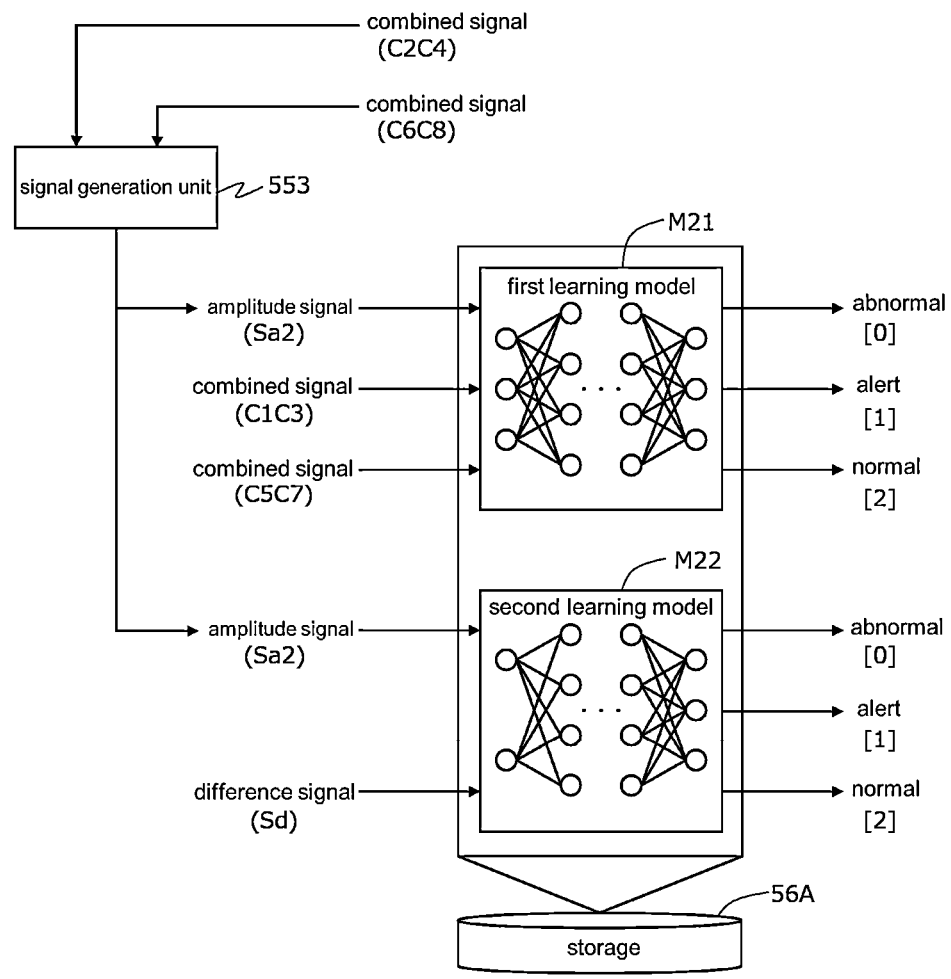
FIG. 18 is a schematic diagram illustrating an example of information stored in the storage included in the motor bearing wear state estimation device in FIG. 17.

FIG. 18 is a schematic diagram illustrating an example of the information (the first learning model M21, the second learning model M22) stored in the storage 56A.

The "first learning model M21" is a learned learning model that is machine-learned in such a way as to output the radial wear state when the combined signal C1C3, the combined signal C5C7, and the amplitude signal Sa2 are input. The first learning model M21 is generated in advance by the machine learning device 6 and stored in the storage 56A, for example, in a manner similar to the first learning model M11.

The "second learning model M22" is a learned learning model that is machine-learned in such a way as to output the thrust wear state when the difference signal Sd and the amplitude signal Sa2 are input. The second learning model M22 is generated in advance by the machine learning device 6 and stored in the storage 56A, for example, in a manner similar to the second learning model M12.

When the machine learning device 6 generates the first learning model M21 and the second learning model M22, the test device 7 generates the amplitude signal Sa2 by using the same method as a method for generating the amplitude signal Sa2 described later. The pseudo-signal generator 8 generates a pseudo amplitude signal Sa2 by calculation.

Method (Processing) for Generating Amplitude Signal

Next, a method (processing) for generating the amplitude signal Sa2 in the present embodiment will be described.

When the present pump 1 is in operation, the signal generation unit 553 periodically retrieves the combined signal C2C4 and the combined signal C6C8. As described above, each retrieved combined signal (C2C4, C6C8) is a DC digital signal.

Then, the signal generation unit 553 generates the amplitude signal Sa2 by weighting each of the combined signals C2C4 and C6C8 and adding the weighted combined signals C2C4 and C6C8 to each other. The weighting is performed by multiplying the voltage value of each combined signal (C2C4, C6C8) by a weighting coefficient. The generated amplitude signal Sa2 is retrieved by the retrieval unit 550.

Figure 19A:
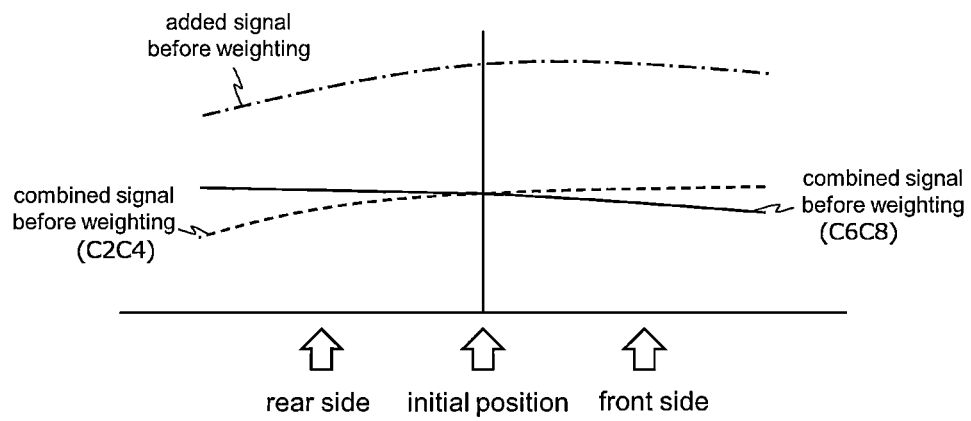
FIG. 19A illustrates a state before the weighting and FIG. 19B illustrates a state after the weighting.
Figure 19B:
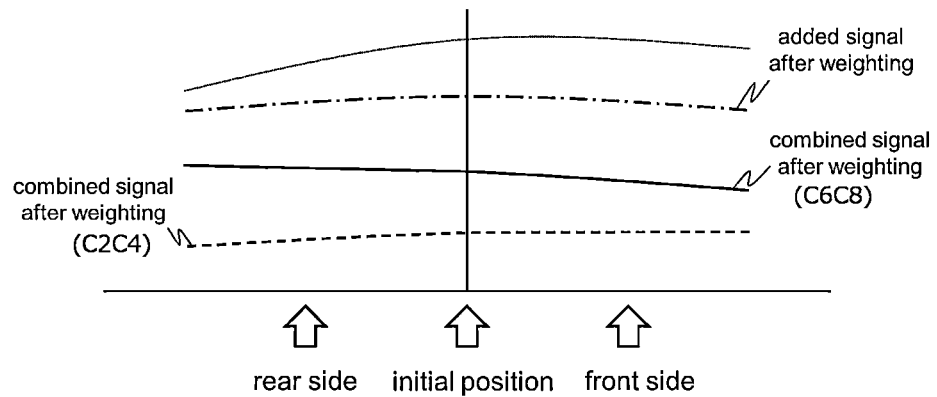

FIG. 19 is a schematic diagram illustrating the weighting by the signal generation unit 553, in which FIG. 19A illustrates a state before the weighting and FIG. 19B illustrates a state after the weighting. In the figures, the vertical axis indicates the signal level (the voltage), and the horizontal axis indicates the amount of displacement of the rotor 36 in the thrust direction (the amount of wear of the bearings 32 and 33). For convenience of description, FIG. 19B illustrates a state before the weighting with a thin line. For convenience of description, the figures emphasize and illustrate changes in voltage values.

As described above, the voltage value of each of the combined signals C2C4 and C6C8 decreases in a curved shape with respect to the displacement of the rotor 36 on one direction side in the thrust direction, and the voltage value of each of the combined signals C2C4 and C6C8 becomes substantially constant with respect to the displacement of the rotor 36 on the other direction side in the thrust direction. The change in the curved shape indicates the displacement information of the rotor 36 in the thrust direction. Thus, when the combined signal C2C4 and the combined signal C6C8 are simply added up, the added signal includes the displacement information of the rotor 36 in the thrust direction. As a result, as illustrated in FIG. 19A, the change in the voltage value of the added signal with respect to the position of the rotor 36 illustrated with dash-dotted line becomes a slightly upward convex curve shape and does not become constant. The detection sensitivity (the change in the voltage value) of the detection coils C2 and C4 on the front side and the detection coils C6 and C8 on the rear side with respect to the displacement of the rotor 36 is influenced by an initial position determined for each model of the present pump 1 and by a magnetic circuit. Thus, the detection sensitivity of the detection coils C2 and C4 may be different from the detection sensitivity of the detection coils C6 and C8. Accordingly, as illustrated in FIG. 19A, there may be a state where the change in the combined signal C2C4 is larger than the change in the combined signal C6C8. In this case, as illustrated in FIG. 19A, the voltage value of the added signal varies in a positively-sloped curved shape in the front-rear direction. The above-described "weighting coefficient" is a coefficient that is multiplied by the voltage value of each of the combined signals C2C4 and C6C8 in such a way as to cancel out the change in the voltage value (the displacement information), based on the change in the magnetic flux. That is, the weighting is performed in such a way as to cancel (decrease) a curve-shaped change (and a change such as to be sloped) in the voltage value of each of the combined signals C2C4 and C6C8. The weighting coefficient is set to, for example, a decimal fraction less than "1.0" or "1.0" (except for 0: in the example illustrated in FIG. 19, "0.5" for the combined signal C2C4, and "1.0" for the combined signal C6C8). In this case, the smaller the weighting coefficient (approaching 0), the smaller the change in the voltage value after the weighting. Accordingly, for example, when the change in the voltage value of the combined signal C2C4 is smaller than the change in the combined signal C6C8, the value of the weight coefficient for the combined signal C2C4 is set (to a value close to "1.0") larger than the value of the weight coefficient for the combined signal C6C8. For example, when both changes are approximately the same, the values of both weight coefficients are set to the same value. For example, when the change in the voltage value of the added signal is sloped, the value of the weighting coefficient for the side with a large contribution to the slope is set (to a value close to "0") smaller than the value of the weighting coefficient for the side with a small contribution to the slope. As a result of the weighting, in the combined signal C2C4 weighted by less than "1.0", the change in the voltage value, i.e., the displacement information, decreases, and the change in the voltage value is corrected in such a way as to be substantially constant regardless of the position of the rotor 36 (in such a way as to approach linearly) as illustrated in FIG. 19B. Thus, the change in the voltage value of the added signal that varies in a positively-sloped curved shape is also small, and the change is substantially constant. By setting the weighting coefficient in this way, the change in the voltage value of each of the combined signals C2C4 and C6C8 becomes small, and the curve-shaped change (and the change such as to be sloped) also becomes small. The weighting coefficient is measured in advance prior to shipment of the present pump 1 in a predetermined reference driving condition, for example, and stored in the storage 56A. Note that, in the present invention, the weighting may be performed using a function that cancels the displacement information. In this case, the storage 56A stores the function instead of the weighting coefficient.

In the present invention, the weight coefficient of the combined signal C2C4 on the front side may be different from or the same as the weight coefficient of the combined signal C6C8 on the rear side.

Operation of Canned Motor Pump (Motor Bearing Wear State Estimation Device 2)

The operation of the present pump 1 in the second embodiment is common to the operation of the present pump 1 in the first embodiment, except that the method for generating the amplitude signal Sa2 is different from the method for generating the amplitude signal Sa1 in the first embodiment and the amplitude signal Sa2 used in the radial wear state estimation processing ST1 and the thrust wear state estimation processing ST2 is different from the amplitude signal Sa1 in the first embodiment. That is, the present pump 1 in the second embodiment repeatedly executes the radial wear state estimation processing ST1 and the thrust wear state estimation processing ST2 on a regular basis (e.g., every few seconds). In this case, the estimation unit 551 uses the amplitude signal Sa2 instead of the amplitude signal Sa1.

Conclusion 2

According to the second embodiment described above, each of the plurality of detection coils C1 to C8 outputs a detection signal indicating a change in magnetic flux corresponding to a mechanical position change of the rotor 36 with respect to the stator 37. The detection coils C1 to C8 include the plurality of detection coils C1, C3, C5, and C7 that each detects a change in the magnetic flux in the radial direction and the plurality of detection coils C2, C4, C6, and C8 that each detects a change in the magnetic flux in the thrust direction. The detection signal includes a fundamental component based on a driving frequency of the motor unit 3. The present device 5A includes the retrieval unit 550, the estimation unit 551, the signal generation unit 553, and the storage 56A. The storage 56A stores the first learning model M21 and the second learning model M22. The first learning model M21 is machine-learned in such a way as to output a radial wear state when the combined signal C1C3, the combined signal C5C7, and the amplitude signal Sa2 are input. The second learning model M22 is machine-learned in such a way as to output a thrust wear state when the difference signal Sd and the amplitude signal Sa2 are input. The amplitude signal Sa2 is generated based on the combined signals C2C4 and C6C8. According to this configuration, the present device 5A is able to estimate the wear state depending on the driving condition by using, as the input data to the learned learning model, the amplitude signal Sa2 mainly including the amplitude (the signal level) of the fundamental component increasing and decreasing in proportion to the increase and decrease of the driving condition, and the combined signals C1C3 and C5C7 and the difference signal Sd indicating the amount of wear (the wear state) of the bearings 32 and 33. Accordingly, even though the driving condition is changed, the present device 5A is able to estimate the wear state depending on the driving condition without manual operation for the device.

According to the second embodiment described above, the signal generation unit 553 generates the amplitude signal Sa2 by weighting each of the combined signal C2C4 and the combined signal C6C8 in such a way as to cancel the change in the magnetic flux based on the wear of the bearings 32 and 33 in the thrust direction and adding the weighted combined signal C2C4 and the weighted combined signal C6C8 to each other.

According to this configuration, in the amplitude signal Sa2, the displacement information in the thrust direction is substantially canceled out. Thus, the present device 5A is able to use, as the input data of the learned learning model, the amplitude signal Sa2 mainly including the amplitude (the signal level) of the fundamental component increasing and decreasing in proportion to the increase and decrease of the driving condition. Accordingly, the present device 5A is able to estimate the wear state depending on the driving condition with little influence from the displacement information.

Note that, in the second embodiment described above, the signal generation unit 553 may generate an average as the amplitude signal instead of the sum of the two combined signals C2C4 and C6C8.

In the second embodiment described above, the change in the voltage value of the added signal between the combined signal C2C4 and the combined signal C6C8 with respect to the position of the rotor 36 is about 7 to 10%. Thus, even though the signal generation unit 553 generates the amplitude signal Sa2 without weighting each of the combined signals C2C4 and C6C8, the influence on the estimation of the displacement information may be limited. Accordingly, the signal generation unit 553 may generate the amplitude signal Sa2 without weighting each of the combined signals C2C4 and C6C8. In this configuration, since the influence of the displacement information remains greater in the amplitude signal Sa2 than in the second embodiment, the estimation accuracy of the wear state is slightly deteriorated when the wear in the thrust direction progresses. However, as described above, since the change in the added signal is in a slightly upwardly convex curve shape, the estimation accuracy decreases in a direction that detects the wear state slightly more sensitively. Thus, the present device 5A is able to sufficiently function as a device for estimating the wear state of the bearings 32 and 33. Accordingly, even with this configuration, the present device 5A is able to estimate the wear state depending on the driving condition at a level required for the present device 5A without manual operation for the device even though the driving condition is changed.

Other Embodiments

Note that, in the embodiments described above, the center of the rotor 36 in the thrust direction at the initial position of the rotor 36 need not coincide with the center of the stator 37 due to manufacturing errors, position tolerances, and the like. That is, for example, in the initial position, the rotor 36 may be disposed with being dislocated to the thrust direction with respect to stator 37.

In the embodiments described above, the number of the detection coils C1 to C8 is not limited to "eight" as long as the present invention can be implemented.

In the embodiments described above, the controller (55, 55A) may include a processor such as a digital signal processor (DSP), a graphics processing unit (GPU), a general-purpose graphics processing unit (GPGPU), or the like, instead of the CPU 55a.

In the embodiments described above, the present method is executed by the controller (55, 55A). Alternatively, the present method may be executed by an external computing device (e.g., a computer, etc.) connected to the present device (5, 5A).

In the embodiments described above, a part or all of the information stored in the ROM 55c may be stored in the storage (56, 56A). Alternatively, a part of the information stored in the storage (56, 56A) (e.g., the first learning models M11, M21, the second learning models M12, M22) may be stored in the ROM 55c. In the latter case, the ROM 55c may function as a storage in the present invention.

Aspects of the Present Invention

Next, aspects of the present invention conceived from the embodiments described above will be described below with reference to the terms and reference signs described in the embodiments.

A first aspect of the present invention is a motor bearing wear state estimation device (e.g., the present devices 5 and 5A) for estimating a wear state of bearings (e.g., the bearings 32 and 33) that support a rotating shaft (e.g., the rotating shaft 31) of a rotor (e.g., the rotor 36), based on each detection signal of a plurality of detection coils (e.g., the detection coils C1 to C8) that each detects a change in magnetic flux corresponding to a mechanical position change of the rotor with respect to a stator (e.g., the stator 37) of a motor (e.g., the motor unit 3) in a canned motor pump (e.g., the present pump 1), in which each of the plurality of detection coils is attached to the stator, the detection signal includes a fundamental component based on a driving frequency of the motor, the plurality of detection coils includes a plurality of radial detection coils (e.g., the detection coils C1, C3, C5, and C7) that each detects the change in the magnetic flux in a radial direction of the rotating shaft and a plurality of thrust detection coils (e.g., the detection coils C2, C4, C6, and C8) that each detects the change in the magnetic flux in a thrust direction of the rotating shaft, in which the plurality of radial detection coils includes a pair of first radial detection coils (e.g., the detection coils C1 and C3) and another pair of second radial detection coils (e.g., the detection coils C5 and C7), and the plurality of thrust detection coils includes a pair of first thrust detection coils (e.g., the detection coils C2 and C4) and another pair of second thrust detection coils (e.g., the detection coils C6 and C8), and the motor bearing wear state estimation device includes: a storage (e.g., the storages 56 and 56A) that stores a learned first learning model (e.g., the first learning models M11 and M21) that is machine-learned in such a way as to output the wear state in the radial direction when a first difference signal (e.g., the combined signal C1C3) indicating a difference between each detection signal of the pair of first radial detection coils, a second difference signal (e.g., the combined signal C5C7) indicating a difference between each detection signal of the pair of second radial detection coils, and an amplitude signal (e.g., the amplitude signals Sa1 and Sa2) indicating an amplitude of the fundamental component are input, and a learned second learning model (e.g., the second learning models M12 and M22) that is machine-learned in such a way as to output the wear state in the thrust direction when a thrust difference signal (e.g., the difference signal Sd) indicating a difference between a first combined signal (e.g., the combined signal C2C4) obtained by combining each detection signal of the pair of first thrust detection coils and a second combined signal (e.g., the combined signal C6C8) obtained by combining each detection signal of the pair of second thrust detection coils, and the amplitude signal are input; a retrieval unit (e.g., the retrieval unit 550) that retrieves the first difference signal, the second difference signal, the thrust difference signal, and the amplitude signal; and an estimation unit (e.g., the estimation unit 551) that estimates the wear state by inputting the first difference signal, the second difference signal, and the amplitude signal that are retrieved by the retrieval unit into the first learning model, and by inputting the thrust difference signal and the amplitude signal that are retrieved by the retrieval unit into the second learning model, in which the amplitude signal is a first amplitude signal Sa1 generated based on each detection signal of the first radial detection coils and/or each detection signal of the second radial detection coils, or a second amplitude signal Sa2 generated based on the first combined signal and the second combined signal. According to this configuration, even though the driving condition is changed, the present device is able to estimate the wear state depending on the driving condition without manual operation for the device.

A second aspect of the present invention is the motor bearing wear state estimation device in the first aspect further including a signal generation unit (e.g., the signal generation units 53 and 553) that generates the first amplitude signal (e.g., the amplitude signal Sa1), based on each detection signal of the first radial detection coils and/or each detection signal of the second radial detection coils, or generates the second amplitude signal (e.g., the amplitude signal Sa2), based on the first combined signal and the second combined signal. According to this configuration, the retrieval unit is able to retrieve, at any timing, the amplitude signal that is the input data of the learning model.

A third aspect of the present invention is the motor bearing wear state estimation device (e.g., the present device 5) in the second aspect, in which the signal generation unit (e.g., the signal generation unit 53) generates the first amplitude signal (e.g., the amplitude signal Sa1) by adding up each detection signal of the first radial detection coils and/or the second radial detection coils. According to this configuration, the present device is able to estimate the thrust wear state and the radial wear state depending on the driving condition without any influence from displacement information.

A fourth aspect of the present invention is the motor bearing wear state estimation device in the third aspect, in which the signal generation unit adds up each detection signal of all the radial detection coils. According to this configuration, the present device is able to estimate the thrust wear state and the radial wear state more accurately depending on the driving condition without any influence from the displacement information.

A fifth aspect of the present invention is the motor bearing wear state estimation device (e.g., the present device 5A) in the second aspect, in which the signal generation unit (e.g., the signal generation unit 553) performs weighting on each of the first combined signal and the second combined signal in such a way as to cancel the change in the magnetic flux based on wear of the bearings in the thrust direction, and generates the second amplitude signal (e.g., the amplitude signal Sa2) by adding the weighted first combined signal and the weighted second combined signal to each other. According to this configuration, the present device is able to estimate the wear state depending on the driving condition with little influence from the displacement information.

A sixth aspect of the present invention is a motor bearing wear state estimation method (e.g., the radial wear state estimation processing ST1 and the thrust wear state estimation processing ST2) executed by a motor bearing wear state estimation device (e.g., the present devices 5 and 5A) for estimating a wear state of bearings (e.g., the bearings 32 and 33) that support a rotating shaft (e.g., the rotating shaft 31) of a rotor (e.g., the rotor 36), based on each detection signal of a plurality of detection coils (e.g., the detection coils C1 to C8) that each detects a change in magnetic flux corresponding to a mechanical position change of the rotor with respect to a stator (e.g., the stator 37) of a motor (e.g., the motor unit 3) in a canned motor pump (e.g., the present pump 1), in which each of the plurality of detection coils is attached to the stator, the detection signal includes a fundamental component based on a driving frequency of the motor, the plurality of detection coils includes a plurality of radial detection coils (e.g., the detection coils C1, C3, C5, and C7) that each detects the change in the magnetic flux in a radial direction of the rotating shaft and a plurality of thrust detection coils (e.g., the detection coils C2, C4, C6, and C8) that each detects the change in the magnetic flux in a thrust direction of the rotating shaft, in which the plurality of radial detection coils includes a pair of first radial detection coils and another pair of second radial detection coils, and the plurality of thrust detection coils includes a pair of first thrust detection coils and another pair of second thrust detection coils, and the motor bearing wear state estimation device includes a storage (e.g., the storages 56 and 56A) that stores a learned first learning model that is machine-learned in such a way as to output the wear state in the radial direction when a first difference signal indicating a difference between each detection signal of the pair of first radial detection coils, a second difference signal indicating a difference between each detection signal of the pair of second radial detection coils, and an amplitude signal indicating an amplitude of the fundamental component are input, and a learned second learning model that is machine-learned in such a way as to output the wear state in the thrust direction when a thrust difference signal indicating a difference between a first combined signal obtained by combining each detection signal of the pair of first thrust detection coils and a second combined signal obtained by combining each detection signal of the pair of second thrust detection coils, and the amplitude signal are input, the amplitude signal is a first amplitude signal generated based on each detection signal of the first radial detection coils and/or each detection signal of the second radial detection coils, or a second amplitude signal generated based on the first combined signal and the second combined signal, the motor bearing wear state estimation method including: retrieving (e.g., retrieving steps ST11 and ST21), with the motor bearing wear state estimation device, the first difference signal, the second difference signal, the thrust difference signal, and the amplitude signal; and estimating (e.g., estimating steps ST12 and ST22), with the motor bearing wear state estimation device, the wear state by inputting the retrieved first difference signal, the retrieved second difference signal, and the retrieved amplitude signal into the first learning model and by inputting the retrieved thrust difference signal and the retrieved amplitude signal into the second learning model. According to this configuration, even though the driving condition is changed, the present device is able to estimate the wear state depending on the driving condition without manual operation for the device.

A seventh aspect of the present invention is a bearing wear state estimation program that causes a computer to function as the motor bearing wear state estimation device according to the first aspect. According to this configuration, even though the driving condition is changed, the present device is able to estimate the wear state depending on the driving condition without manual operation for the device.

An eighth aspect of the present invention is a canned motor pump (e.g., the present pump 1) including: a motor (e.g., the motor unit 3) including a rotor (e.g., the rotor 36), a stator (e.g., the stator 37) that rotates the rotor, and a rotating shaft (e.g., the rotating shaft 31) that rotates together with the rotor; bearings (e.g., the bearings 32 and 33) that support the rotating shaft; a plurality of detection coils (e.g., the detection coils C1 to C8) that each detects a change in magnetic flux corresponding to a mechanical position change of the rotor with respect to the stator; and the motor bearing wear state estimation device (e.g., the present devices 5 and 5A) according to any one of the first to the fifth aspects that estimates a wear state of the bearings, based on each detection signal of the plurality of detection coils. According to this configuration, even though the driving condition is changed, the present pump is able to estimate the wear state depending on the driving condition without manual operation for the device.

REFERENCE SIGNS LIST

1 Canned motor pump
3 Motor unit
31 Rotating shaft
32 Bearing
33 Bearing
36 Rotor
37 Stator
5 Motor bearing wear state estimation device
53 Signal generation unit
550 Retrieval unit
551 Estimation unit
56 Storage
5A Motor bearing wear state estimation device
553 Signal generation unit
56A Storage
C1 to C8 Detection coil
M11 First learning model
M12 Second learning model
M21 First learning model

The invention claimed is:

1. A motor bearing wear state estimation device for estimating a wear state of bearings that support a rotating shaft of a rotor, based on each detection signal of a plurality of detection coils that each detects a change in magnetic flux corresponding to a mechanical position change of the rotor with respect to a stator of a motor in a canned motor pump, wherein
each of the plurality of detection coils is attached to the stator,
the detection signal includes a fundamental component based on a driving frequency of the motor,
the plurality of detection coils includes a plurality of radial detection coils configured to detect the change in the magnetic flux in a radial direction of the rotating shaft and a plurality of thrust detection coils configured to detect the change in the magnetic flux in a thrust direction of the rotating shaft, wherein
the plurality of radial detection coils includes a pair of first radial detection coils and another pair of second radial detection coils, and
the plurality of thrust detection coils includes a pair of first thrust detection coils and another pair of second thrust detection coils,
the motor bearing wear state estimation device comprising:
a storage configured to store
a learned first learning that is machine-learned in such a way as to output the wear state in the radial direction when a first difference signal indicating a difference between each detection signal of the pair of first radial detection coils, a second difference signal indicating a difference between each detection signal of the pair of second radial detection coils, and an amplitude signal indicating an amplitude of the fundamental component are input, and
a learned second learning model that is machine-learned in such a way as to output the wear state in the thrust direction when a thrust difference signal indicating a difference between a first combined signal obtained by combining each detection signal of the pair of first thrust detection coils and a second combined signal obtained by combining each detection signal of the pair of second thrust detection coils, and the amplitude signal are input;
a retrieval unit configured to retrieve the first difference signal, the second difference signal, the thrust difference signal, and the amplitude signal; and
an estimation unit configured to estimate the wear state by inputting the first difference signal, the second difference signal, and the amplitude signal that are retrieved by the retrieval unit into the first learning model, and by inputting the thrust difference signal and the amplitude signal that are retrieved by the retrieval unit into the second learning model, wherein
the amplitude signal is a first amplitude signal generated based on each detection signal of the first radial detection coils and/or each detection signal of the second radial detection coils, or a second amplitude signal generated based on the first combined signal and the second combined signal.

2. The motor bearing wear state estimation device according to claim 1 further comprising a signal generation unit configured to generate the first amplitude signal, based on each detection signal of the first radial detection coils and/or each detection signal of the second radial detection coils, or generates the second amplitude signal, based on the first combined signal and the second combined signal.

3. The motor bearing wear state estimation device according to claim 2, wherein the signal generation unit generates the first amplitude signal by adding up each detection signal of the first radial detection coils and/or each detection signal of the second radial detection coils.

4. The motor bearing wear state estimation device according to claim 3, wherein the signal generation unit adds up each detection signal of all the radial detection coils.

5. The motor bearing wear state estimation device according to claim 2, wherein the signal generation unit performs weighting on each of the first combined signal and the second combined signal in such a way as to cancel change in the magnetic flux based on wear of the bearing in the thrust direction, and generates the second amplitude signal by adding the weighted first combined signal and the weighted second combined signal to each other.

6. A non-transitory storage medium storing a bearing wear state estimation program executable on a computer to cause the computer to function as the motor bearing wear state estimation device according to claim 1.

7. A canned motor pump comprising:
   a motor including a rotor, a stator configured to rotate the rotor, and a rotating shaft configured to rotate together with the rotor;
   bearings that support the rotating shaft;
   a plurality of detection coils configured to detect a change in magnetic flux corresponding to a mechanical position change of the rotor with respect to the stator; and
   the motor bearing wear state estimation device according to claim 1 that is configured to estimate a wear state of the bearings, based on each detection signal of the plurality of detection coils.

8. A motor bearing wear state estimation method executed by a motor bearing wear state estimation device for estimating a wear state of bearings that support a rotating shaft of a rotor, based on each detection signal of a plurality of detection coils that each detects a change in magnetic flux corresponding to a mechanical position change of the rotor with respect to a stator of a motor in a canned motor pump, wherein
   each of the plurality of detection coils is attached to the stator,
   the detection signal includes a fundamental component based on a driving frequency of the motor,
   the plurality of detection coils includes a plurality of radial detection coils configured to detect the change in the magnetic flux in a radial direction of the rotating shaft and a plurality of thrust detection coils configured to detect the change in the magnetic flux in a thrust direction of the rotating shaft, wherein
      the plurality of radial detection coils includes a pair of first radial detection coils and another pair of second radial detection coils, and
      the plurality of thrust detection coils includes a pair of first thrust detection coils and another pair of second thrust detection coils, and the motor bearing wear state estimation device includes a storage that stores
   a learned first learning that is machine-learned in such a way as to output the wear state in the radial direction when a first difference signal indicating a difference between each detection signal of the pair of first radial detection coils, a second difference signal indicating a difference between each detection signal of the pair of second radial detection coils, and an amplitude signal indicating an amplitude of the fundamental component are input, and
   a learned second learning model that is machine-learned in such a way as to output the wear state in the thrust direction when a thrust difference signal indicating a difference between a first combined signal obtained by combining each detection signal of the pair of first thrust detection coils and a second combined signal obtained by combining each detection signal of the pair of second thrust detection coils, and the amplitude signal are input, the amplitude signal is a first amplitude signal generated based on each detection signal of the first radial detection coils and/or each detection signal of the second radial detection coils, or a second amplitude signal generated based on the first combined signal and the second combined signal, the bearing wear state estimation method comprising:

retrieving, with the motor bearing wear state estimation device, the first difference signal, the second difference signal, the thrust difference signal, and the amplitude signal; and estimating, with the motor bearing wear state estimation device, the wear state by inputting the retrieved first difference signal, the retrieved second difference signal, and the retrieved amplitude signal into the first learning model and by inputting the retrieved thrust difference signal and the retrieved amplitude signal into the second learning model.

* * * * *